US011955753B2

(12) United States Patent
Laurx et al.

(10) Patent No.: US 11,955,753 B2
(45) Date of Patent: Apr. 9, 2024

(54) CONNECTOR ASSEMBLY

(71) Applicant: Molex, LLC, Lisle, IL (US)

(72) Inventors: John C. Laurx, Aurora, IL (US); Yueh-Ting Chiang, New Taipei (TW)

(73) Assignee: Molex, LLC, Lisle, IL (US)

(*) Notice: Subject to any disclaimer, the term of this patent is extended or adjusted under 35 U.S.C. 154(b) by 41 days.

(21) Appl. No.: 18/079,018

(22) Filed: Dec. 12, 2022

(65) Prior Publication Data

US 2023/0108875 A1 Apr. 6, 2023

Related U.S. Application Data

(63) Continuation of application No. 17/075,713, filed on Oct. 21, 2020, now Pat. No. 11,532,915.

(60) Provisional application No. 62/925,243, filed on Oct. 24, 2019.

(51) Int. Cl.

| | |
|---|---|
| ***H01R 13/648*** | (2006.01) |
| ***H01R 12/70*** | (2011.01) |
| ***H01R 13/40*** | (2006.01) |
| ***H01R 13/627*** | (2006.01) |
| ***H01R 13/629*** | (2006.01) |
| ***H01R 13/6471*** | (2011.01) |
| ***H01R 13/6587*** | (2011.01) |

(52) U.S. Cl.

CPC ..... *H01R 13/6587* (2013.01); *H01R 12/7005* (2013.01); *H01R 13/40* (2013.01); *H01R 13/627* (2013.01); *H01R 13/629* (2013.01); *H01R 13/6471* (2013.01)

(58) Field of Classification Search

CPC ................ H01R 12/70; H01R 12/7005; H01R 12/7011; H01R 13/6587; H01R 13/40; H01R 13/627; H01R 13/629; H01R 13/6471

USPC ............................................ 439/607.07, 660

See application file for complete search history.

(56) References Cited

U.S. PATENT DOCUMENTS

| | | | |
|---|---|---|---|
| 6,544,050 | B1 | 4/2003 | Ko |
| 2003/0013325 | A1 | 1/2003 | Zaderej et al. |
| 2015/0132994 | A1 | 5/2015 | Zebhauser et al. |
| 2019/0089097 | A1 | 3/2019 | Cho et al. |

FOREIGN PATENT DOCUMENTS

| | | | |
|---|---|---|---|
| CN | 104518310 | A | 4/2015 |
| JP | 2002042984 | A | 2/2002 |
| JP | 2005251433 | A | 9/2005 |

(Continued)

OTHER PUBLICATIONS

International Search Report and Written Opinion received for PCT Application No. PCT/US2020/056231, dated Feb. 9, 2021, 11 Pages.

*Primary Examiner* — Khiem M Nguyen

(57) ABSTRACT

An electrical connector assembly can include a plug connector mountable to a planar substrate and a receptacle connector configured to receive a plurality of cables and that can mate with the plug connector. The plug connector may include a first inline terminal row and a second inline terminal row exposed on a mounting face to conductively contact the planar substrate. The receptacle connector can include a plurality of terminals having termination ends aligned in common wafer plane that can be conductively terminated with the plurality of cables. The plug connector and the electrical connector are configured to establish electrical channels from the termination ends coplanar with the common wafer plan to the first and second inline terminal rows.

20 Claims, 26 Drawing Sheets

(56) References Cited

FOREIGN PATENT DOCUMENTS

| | | | |
|---|---|---|---|
| JP | 2013004518 | A | 1/2013 |
| JP | 2015525427 | A | 9/2015 |
| TW | 247675 | | 5/1995 |
| WO | 20180170209 | A1 | 9/2018 |
| WO | 2019084110 | A1 | 5/2019 |

CONNECTOR ASSEMBLY

RELATED APPLICATIONS

This application is a continuation of U.S. patent application Ser. No. 17/075,713, filed Oct. 21, 2020, which claims the benefit of U.S. Provisional Application No. 62/925,243 filed Oct. 24, 2019, both of which are hereby incorporated by reference in their entireties.

TECHNICAL FIELD

The present disclosure relates generally to electrical connectors and, more specifically, to input/output connectors suitable for use in high data rate applications.

BACKGROUND

Input/output (IO) connectors can be designed for a variety of systems, including board-to-board, wire-to-wire, and wire-to-board systems. A wire-to-board system includes a free-end connector that is attached to a wire, and a fixed-end connector that is attached to a board. A wide range of suitable designs exist for each type of system, depending on requirements and the environment where the connectors are intended to be used.

For applications where data rates are high and physical space is restricted, however, a number of competing requirements make the connector design more challenging. High data rates (data rates equal to or above 25 Gbps) typically use differentially coupled signal pairs in which two conductors are electrically coupled and physically arranged in pairs to transmit a differential signal. The signal being transmitted is embodied by the electrical difference measured between the conductor pairs. Differential signaling helps provide greater resistance to spurious signals and electronic cross-talk, and preferably maintains sufficient spacing to avoid creating inadvertent signaling modes with adjacent differently coupled signals pairs. In the connector interface, ground terminals can be added to create a return path to electrical ground and to provide shielding between differential pairs. However, if space is a problem then it becomes desirable to shrink the pitch of the connector and bring all the terminals closer together (which tends to increase the cross talk).

Thus, electrical connectors are typically designed to meet both mechanical and electrical requirements. High speed or high data rate electrical connectors are often used in, for example, backplane applications that require very high conductor density and high data rates. In order to achieve the desired mechanical and electrical requirements, such connectors often incorporate a plurality of wafer assemblies having an insulative web that supports a plurality of electrically conductive terminals. The use of wafer assemblies is often desirable to create a structure capable of achieving the desired high data rates that is also robust enough to support the desired assembly processes. However, where high data rates are desired and physical space is minimal, the wafers must be configured to minimize the physical footprint of the connector while maintaining adequate electrical characteristics for the transmission of data. In addition, the connector may be used in a mezzanine style arrangement in which a plurality of boards are arranged in a parallel, closely spaced configuration, thereby limiting the vertical distance that the connector may project from the surface of the board. The present disclosure is directed to an electrical connector for application in such circumstances.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

The disclosure describes an electrical connector assembly for electrically interconnecting two substrates such as a printed circuit boards and a plurality of cables. The electrical connector assembly can include a plug connector that can mate to a receptacle connector. Accommodated in each of the plug connector and the receptacle connector can be at least one terminal wafer having a conductive terminal array that may be partially disposed in a non-conductive terminal support molding. The terminal array includes a plurality of terminals that may be elongated with opposing ends configured to mate or mount to corresponding terminals in the other connector or to the substrate or cables. The opposing ends of the terminals may be connected by a mid-body portion. In various embodiments, the plurality of terminals of the terminal wafers may include signal terminals for transmitting data signals and ground terminals for shielding and/or providing an electrical return path.

In an aspect, the plug connector may include a first inline terminal row and a second inline terminal row that are exposed on a mounting face of the plug connector. The terminals in the receptacle wafer may include termination ends that terminate the cables and that are aligned in a common wafer plane. The mid-body portions of at least one of the receptacle wafer and the plug wafer are offset mid-body portions that align a portion of the respective terminals in a first offset terminal plane and a second offset terminal plane. The offset terminal planes establish conductive channels from the common wafer plane of the receptacle connector to the first and second inline terminal rows of the plug connector.

In another aspect, the terminal wafer may include a terminal array with a plurality of terminals each having a mating end, a mounting end, and planar mid-body connecting the mating end and the mounting end. The terminals may be further arranged in a plurality of terminal groups each including at least one terminal. The terminal support molding may be partially disposed around the terminal array to support the terminals. The terminal support molding may include a wafer spine that is adjacent to a surface of planar mid-bodies of the terminal array. The terminal support molding may also include a retention bar that extends about the terminal groups on the opposite surface of the planar mid-bodies to support the terminal array.

The above features and advantages of the disclosure as well as others will be apparent from the following detailed description and the accompanying drawings.

BRIEF DESCRIPTION OF THE DRAWINGS

The present disclosure is illustrated by way of example and not limited in the accompanying figures in which like reference numerals refer to like elements and in which.

DETAILED DESCRIPTION OF PREFERRED EMBODIMENTS

Figure 1:
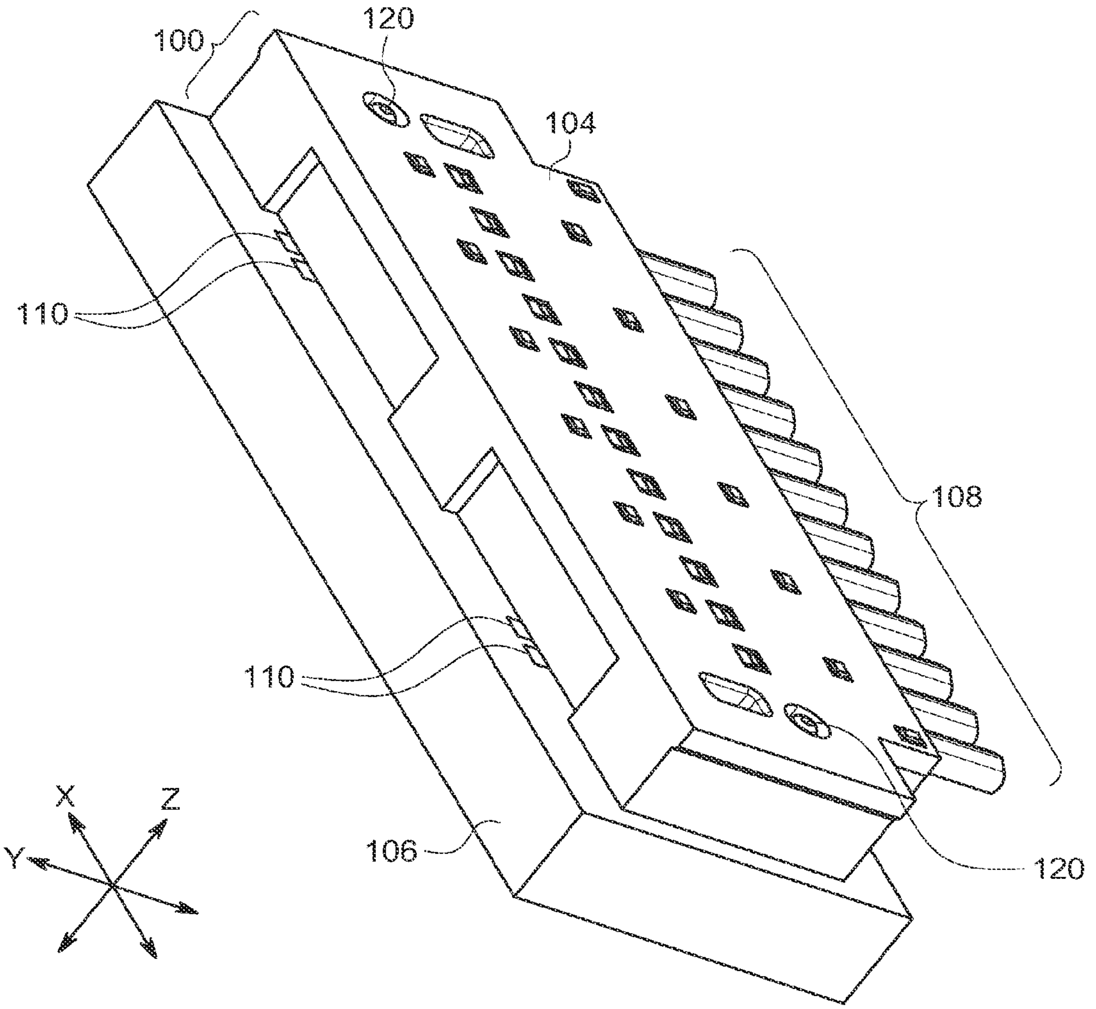
FIG. 1 is a perspective view of a connector system including a plug connector and a receptacle connector mounted to a substrate according to the present disclosure.

Referring to FIGS. 1-4, a wire-to-board connector assembly 100 is depicted. The connector assembly 100 includes a plug connector 102 disposable in a receptacle connector 104. The plug connector 102 is configured to be mounted on a substrate 106 and the receptacle connector 104 is configured to be terminated to a plurality of electrically conductive cables 108. The plug connector 102 can be mated to the receptacle connector 104 to establish electrical communication between the substrate 106 and the plurality of conductive cables 108. For reference purposes, the connector assembly 100 may be spatially arranged with respect to an orthogonal x-y-z coordinate system in which the stacking direction of the plug connector 102 and the receptacle connector 104 normal to the substrate 106 may be referred to as the vertical or z-axis direction, the width of the connector assembly 100 may be referred to as the lateral or x-axis direction, and perpendicular to the lateral direction may be the forward-rearward or y-axis direction. In accordance with the forward-rearward or y-axis direction, the plurality of cables 108 may be considered as extending from the rearward side or surface of the connector assembly 100 while the opposite side or surface may be considered the front or forward direction of the connector assembly 100. However, it should be appreciated that reference to relative coordinates and directions are for reference purposes only and should not be construed as a limitation on the scope of the claims. The plug connector 102 may be placed adjacently against a surface of the substrate 106 and the receptacle connector 104 can be arranged so that the cables 108 are directed in the forward-rearward (y-axis) direction parallel to the substrate and generally perpendicular to the vertical (z-axis) direction of the plug and receptacle connectors 102, 104. The connector assembly 100 thus has an orthogonal or right-angled configuration. Moreover, the vertical height of plug connector 102 and the receptacle connector 104 can be minimized so the connector assembly 100 maintains a low profile for spacing considerations.

Figure 3:
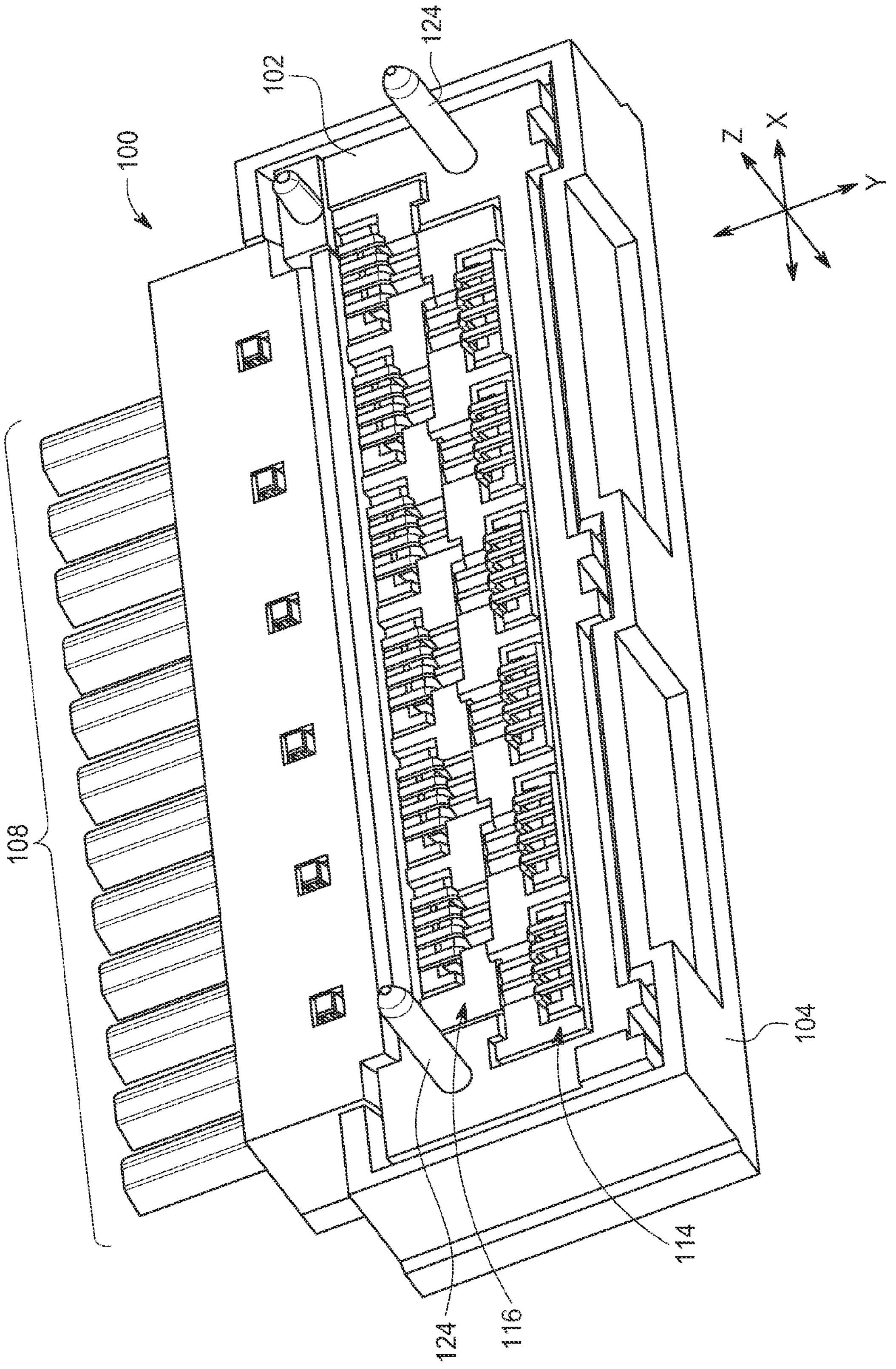
FIG. 3 is a perspective view from the bottom of the connector system illustrating the plug connector accommodated in the receptacle connector and a plurality of exposed terminal tails arranged in first and second inline terminal rows.

The substrate 106 may be any type of generally planar member such as a printed circuit board, a backplane board, or a flexible circuit having electrically conductive traces electrically connected to a plurality of electrically conductive pads 110 on a mounting surface 112 of the substrate. As depicted in FIG. 3, the plug connector 102 is generally enclosed within a cavity defined by the receptacle connector 104 and can include a plurality of conductive contacts or terminals disposed therein that can make electrically conductive contact with the conductive pads 110 on the substrate 106. In the illustrated example, the exposed portions of the terminals are arranged in a first inline terminal row 114 and a parallel second inline terminal row 116. In accordance with an aspect of the disclosure, the plug and receptacle connectors 102, 104 may be operatively configured such that the conductor paths provided by the single row of cables 108 received by the receptacle connector 104 are redirected to provide the parallel first and second inline terminal rows 114, 116 on the mounting face of the plug connector 102. Aligning the plurality of cables 108 in a single parallel row limits the vertical height of the connector assembly 100 while establishing the parallel first and second inline terminal rows 114, 116 increases the density of communication channels that the connector assembly 100 can establish with the substrate 106. Moreover, as explained below, the terminals can be grouped together and the first and second inline terminal rows 114, 116 can be arranged so that the terminal groups of the inline terminal rows are offset and staggered with respect to each other. The connector assembly 100 can be configured so that the plug connector 102 and the receptacle connector 104 are releasably mateable to facilitate assembly and interchangeability of electrical components to which the plug connector and receptacle connector are operatively associated.

Figure 2:
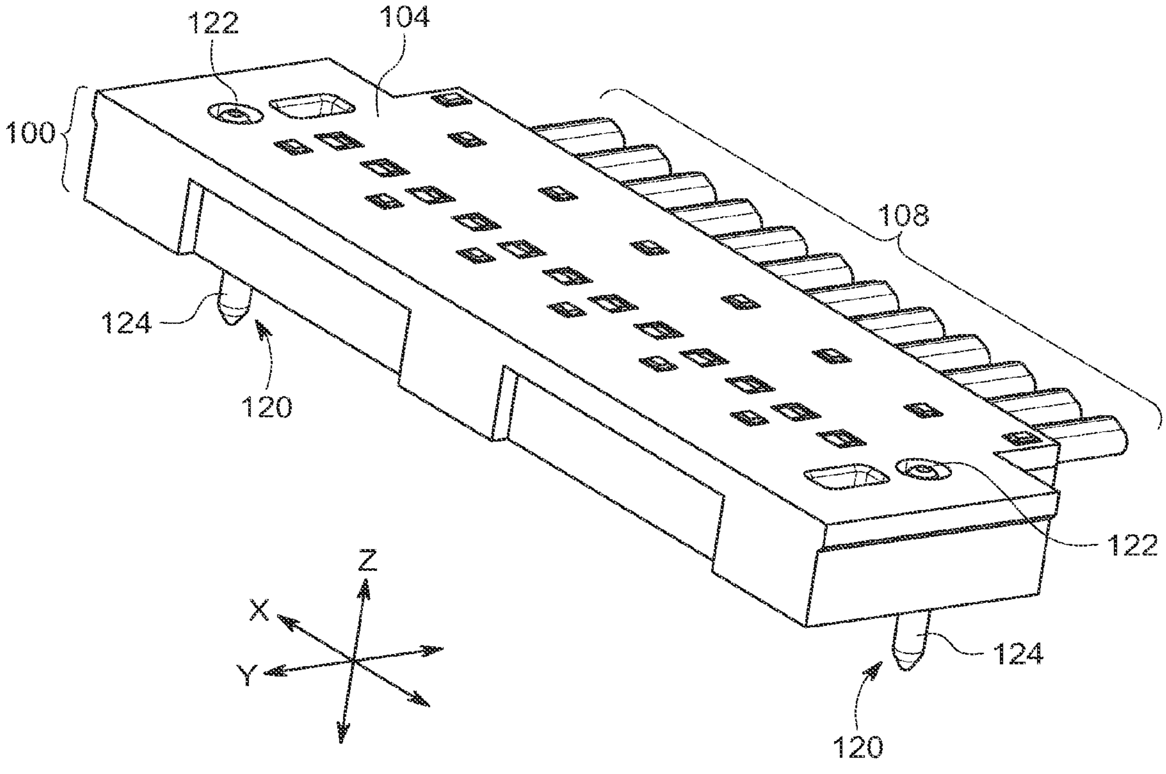
FIG. 2 is a perspective view of the connector system of FIG. 1 in an unmounted state illustrating the mounting nails for positioning the connector on a substrate.
Figure 4:
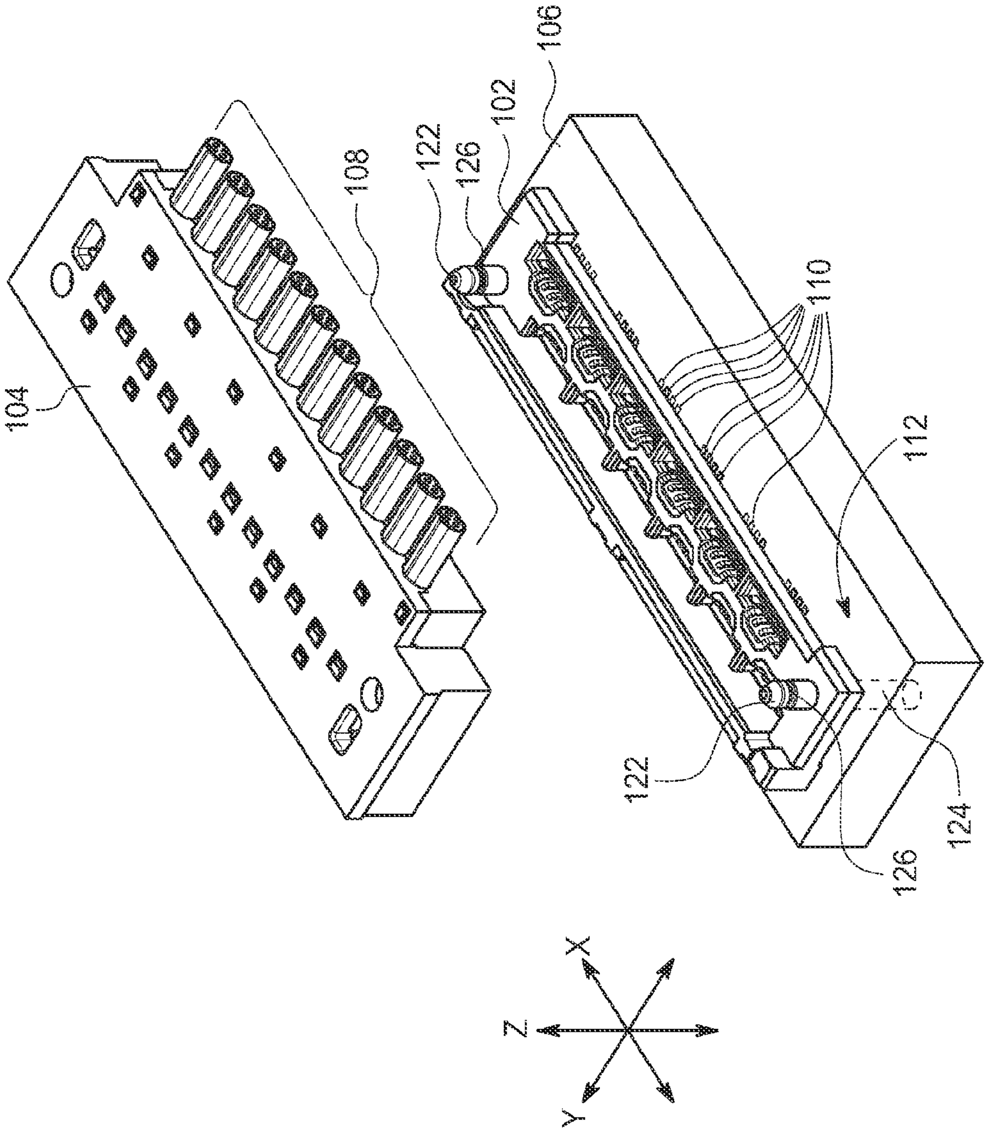
FIG. 4 is an exploded view of the connector system of FIG. 1 illustrating the plug connector and the receptacle connector in an unmated state.
Figure 5:
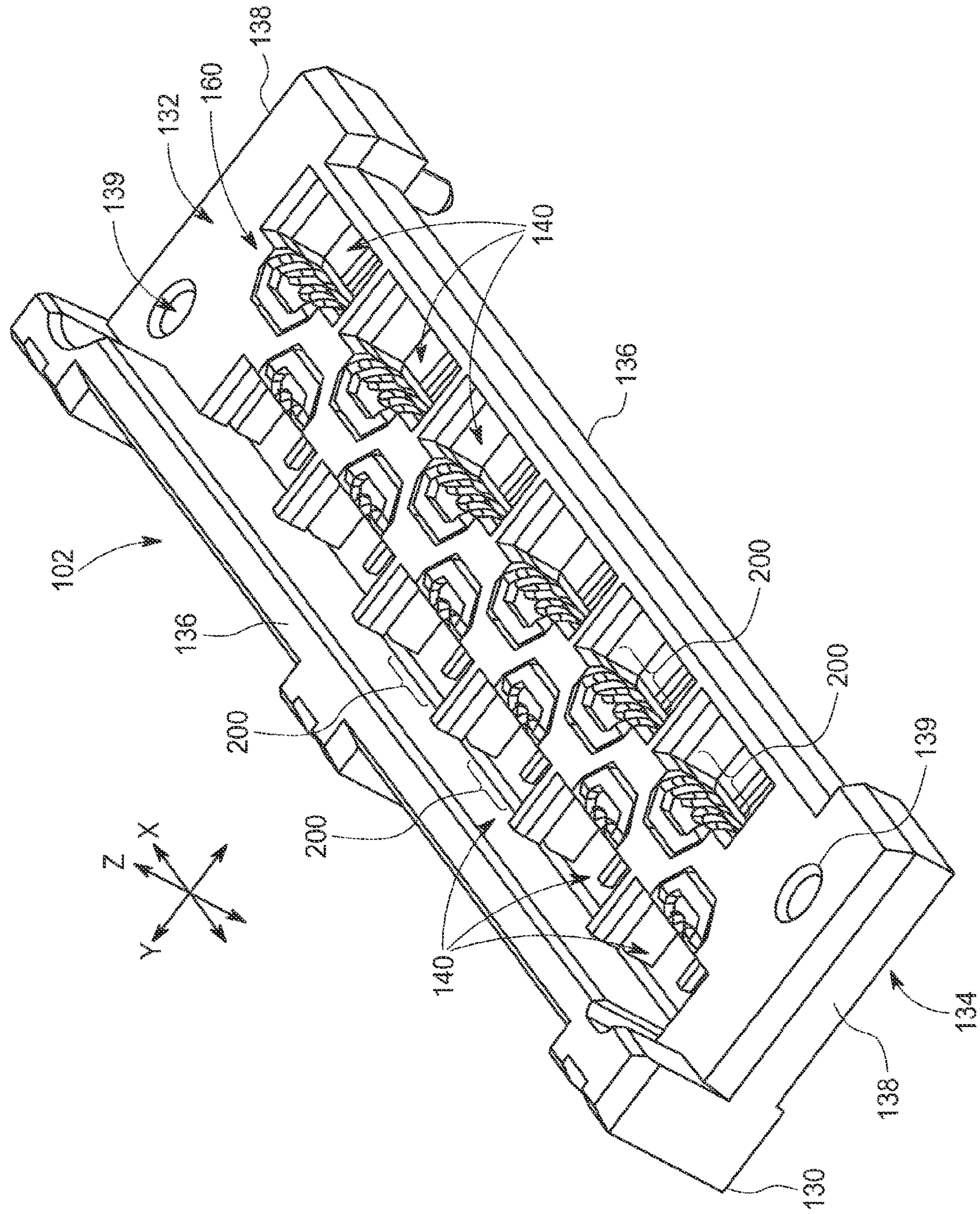
FIG. 5 is a perspective view from the top of the plug connector illustrating a plug insulator housing retaining a terminal subassembly assembled from first and second terminal wafers.
Figure 6:
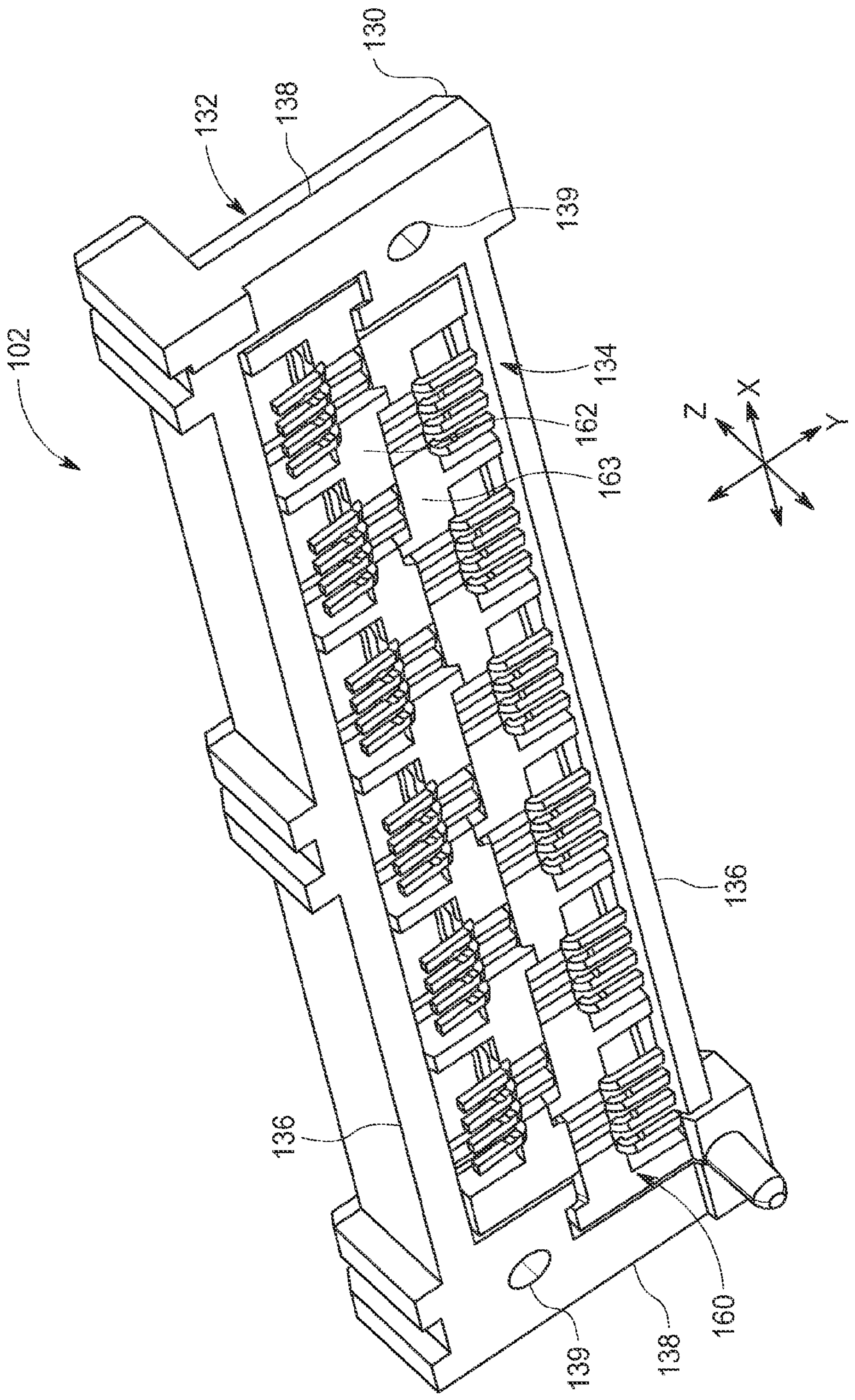
FIG. 6 is a perspective view from the bottom of the plug connector illustrating the terminal subassembly as retained in the plug insulator housing.
Figure 7:
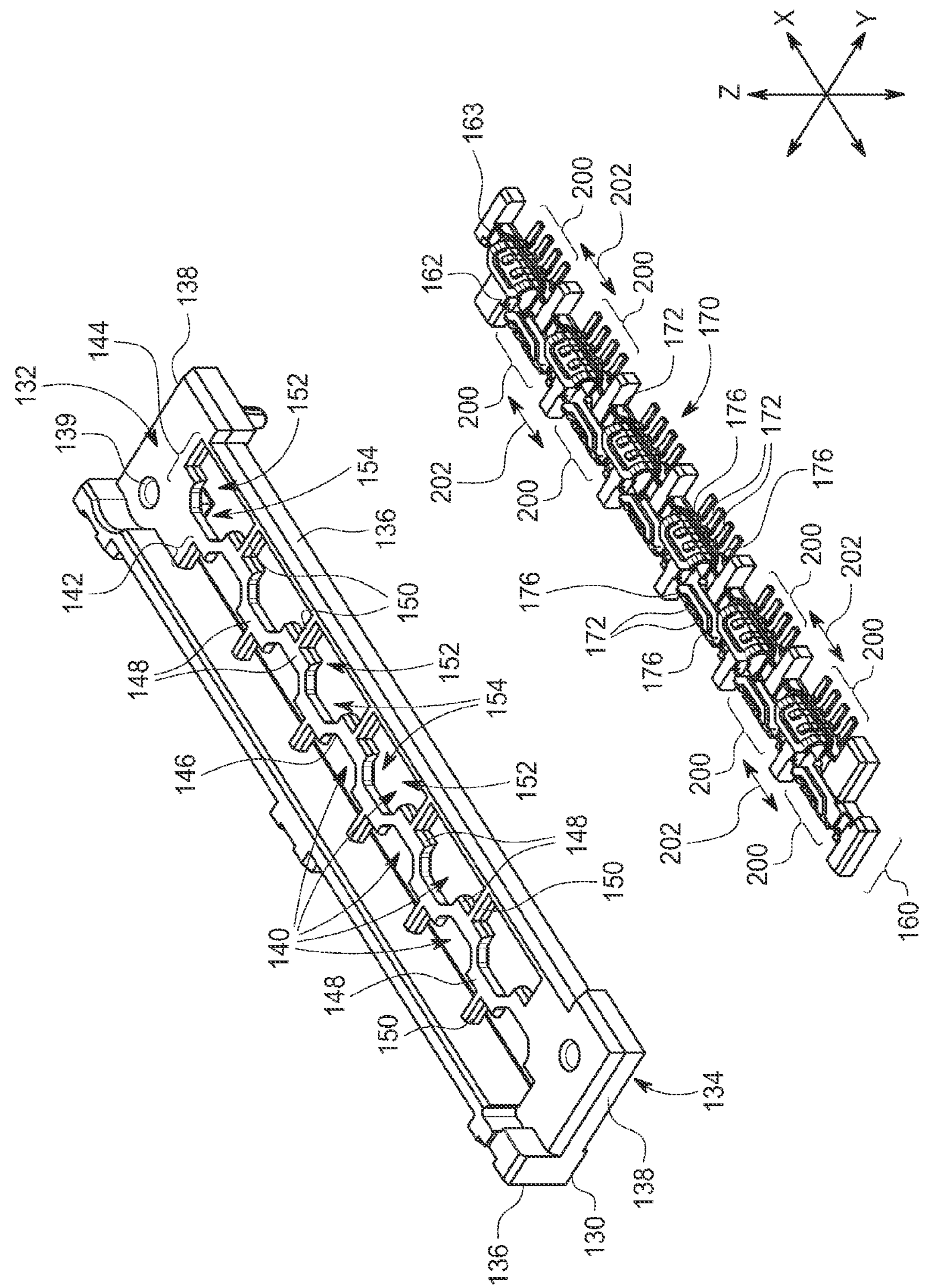
FIG. 7 is a perspective assembly view from the top of the plug connector illustrating the terminal subassembly removed from the plug insulator housing.
Figure 8:
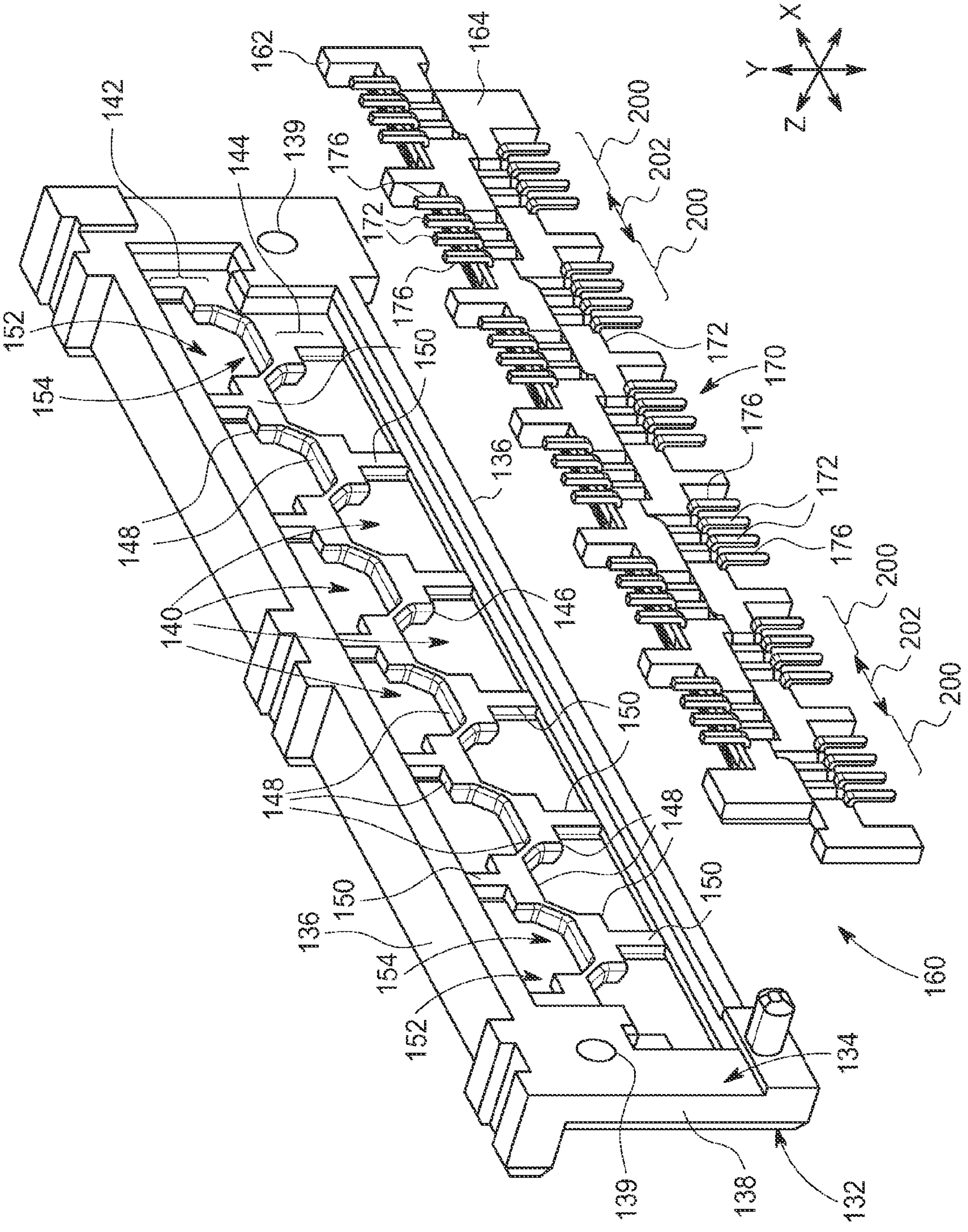
FIG. 8 is a perspective assembly view from the bottom of the plug connector illustrating the terminal subassembly removed from the plug insulator housing.

Referring to FIGS. 2-4, in an embodiment, to align and secure the plug connector 102 to the substrate, the connector assembly 100 can include one or more mounting nails 120. The mounting nails 120 are generally cylindrical in shape and include a nail head 122 and a nail prong 124 projecting from the nail head 122 and of a smaller diameter than the nail head. The nail head 122 and the nail prong may be joined at a circumferential slot 126 of a smaller diameter than either the head or prong. The nail prongs 124 may be tapered at their distal ends and can be inserted through apertures in the plug connector 102 to be received into corresponding nail apertures 129 disposed into the mounting surface 112 of the substrate 106. The nail prongs 124 can be fixedly secured in the nail apertures 129 by solder or adhesive. The larger diameter nail head 122 abuts on the upper face of the plug connector 102 to hold the plug connector adjacently against the mounting surface 112 of the substrate 106. The location of the nail apertures 129 and the conductive pads 110 on the substrate can be operatively arranged so that when the mounting nails 120 are inserted through the plug connector 102 and received in the nail apertures 129, the first and second inline terminal rows 114, 116 align with the respective conductive pads 110.

Referring to FIGS. 5-8, the plug connector 102 includes a plug insulator housing 130 and a terminal subassembly 160. The plug insulator housing 130 is generally rectangular and has a mating face 132 and a parallel but opposing and spaced apart mounting face 134. When the plug connector 102 is mounted to the substrate, the mounting face 134 of the plug insulator housing 130 is adjacent the substrate and the mating face 132 projects away from the substrate and is oriented to face the receptacle connector when mated thereto. The plug insulator housing 130 includes a pair of spaced apart, elongated sidewalls 136 that are integrally joined to a pair of spaced apart, shorter end walls 138 that extend between the sidewalls with the sidewalls and end walls orthogonally arranged to provide the rectangular shape of the plug insulator housing 130. The sidewalls 136 and the end walls 138 join the mating face 132 and mounting face 134. To accommodate the mounting nails, one or more nail apertures 139 can be disposed through the plug insulator housing 130 between the mating face 132 and the mounting face 134. The front sidewall 136 projects vertically above the rear sidewall 136 and above the end walls 138 to define a vertical plug wall. The plug insulator housing 130 can be made from any suitable non-conductive material such as molded thermoplastic.

To accommodate the terminal subassembly 160, a plurality of terminal openings 140 are disposed through the plug insulator housing 130 between the mating face 132 and the mounting face 134. The plurality of terminal openings 140 are aligned in a first opening row 142 adjacent to the front sidewall 136 and a second opening row 144 adjacent to the rear sidewall 136. The first and second opening rows 142, 144 are shifted or staggered with respect to each other so that the terminal openings 140 of the first opening row 142 are offset laterally (with respect to the x-axis) with respect to the terminal openings 140 of the second opening row 144. An alignment beam 146 extends laterally between the first and second opening rows 142, 144 and includes alternating offsets 148 that are alternatively disposed toward the front sidewall 136 or the rear sidewall 136. The alternating arrangement of the offsets 148 provides the staggered appearance of the first and second opening rows 142, 144. The alignment beam 146 is supported between the first and second opening rows 142, 144 by a plurality of support beams 150 that extend perpendicularly from each offset 148 either forward or rearward toward a proximate one of the front and rear sidewalls 136. The shape of the terminal openings 140 are defined by the alternating arrangement of the offsets 148 in the alignment beam 146 and by the support beams 150, with each terminal opening 140 including a generally rectangular cutout 152 and a notch 154. The rectangular cutouts 152 are aligned parallel to the front and rear sidewalls 136 while the notches 154 are complementary to the alternating offsets 148 of the alignment beam 146.

Figure 9:
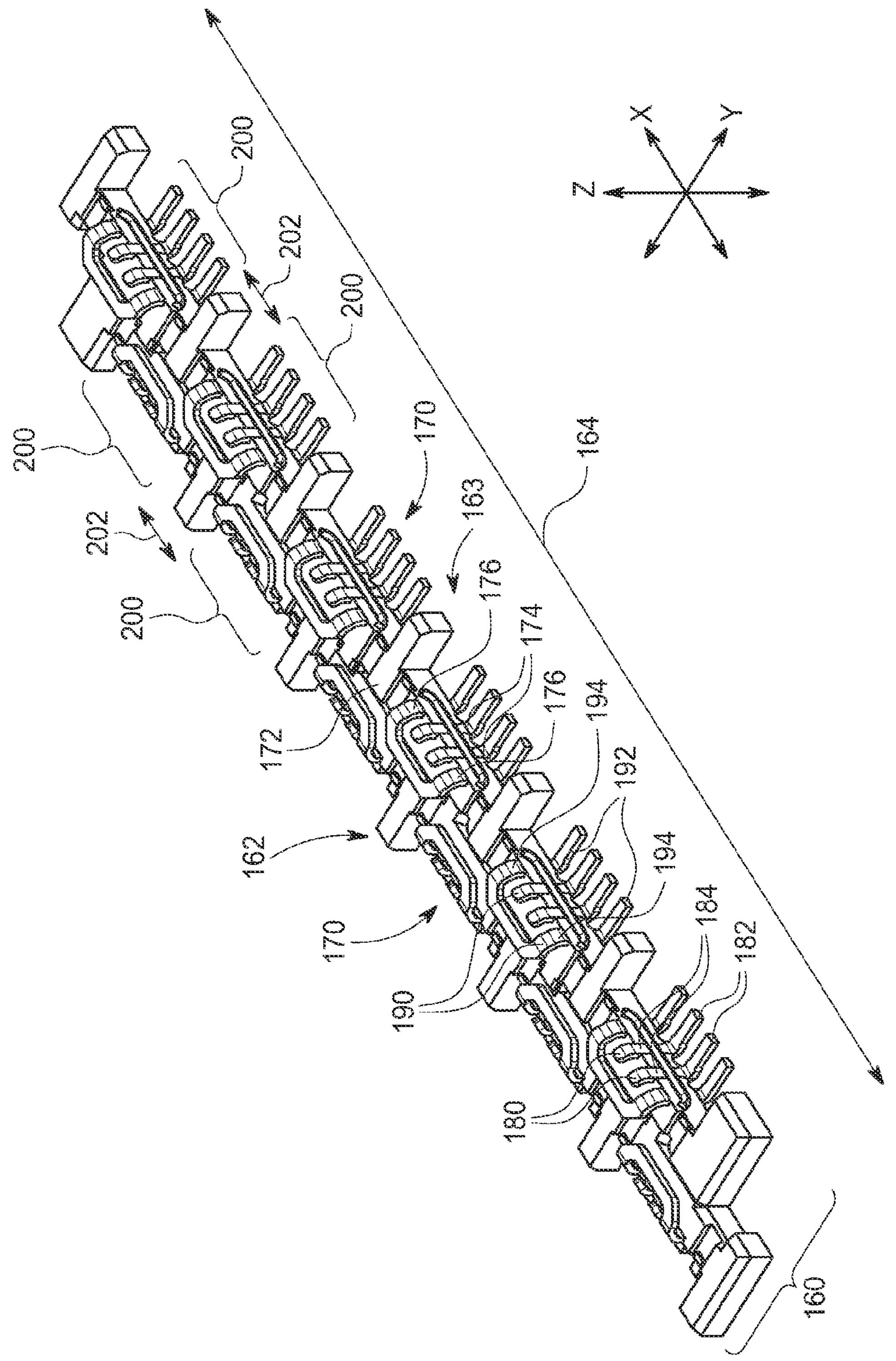
FIG. 9 is a perspective view from above of the terminal subassembly formed by two identical and interconnected hermaphroditic terminal wafers.
Figure 10:
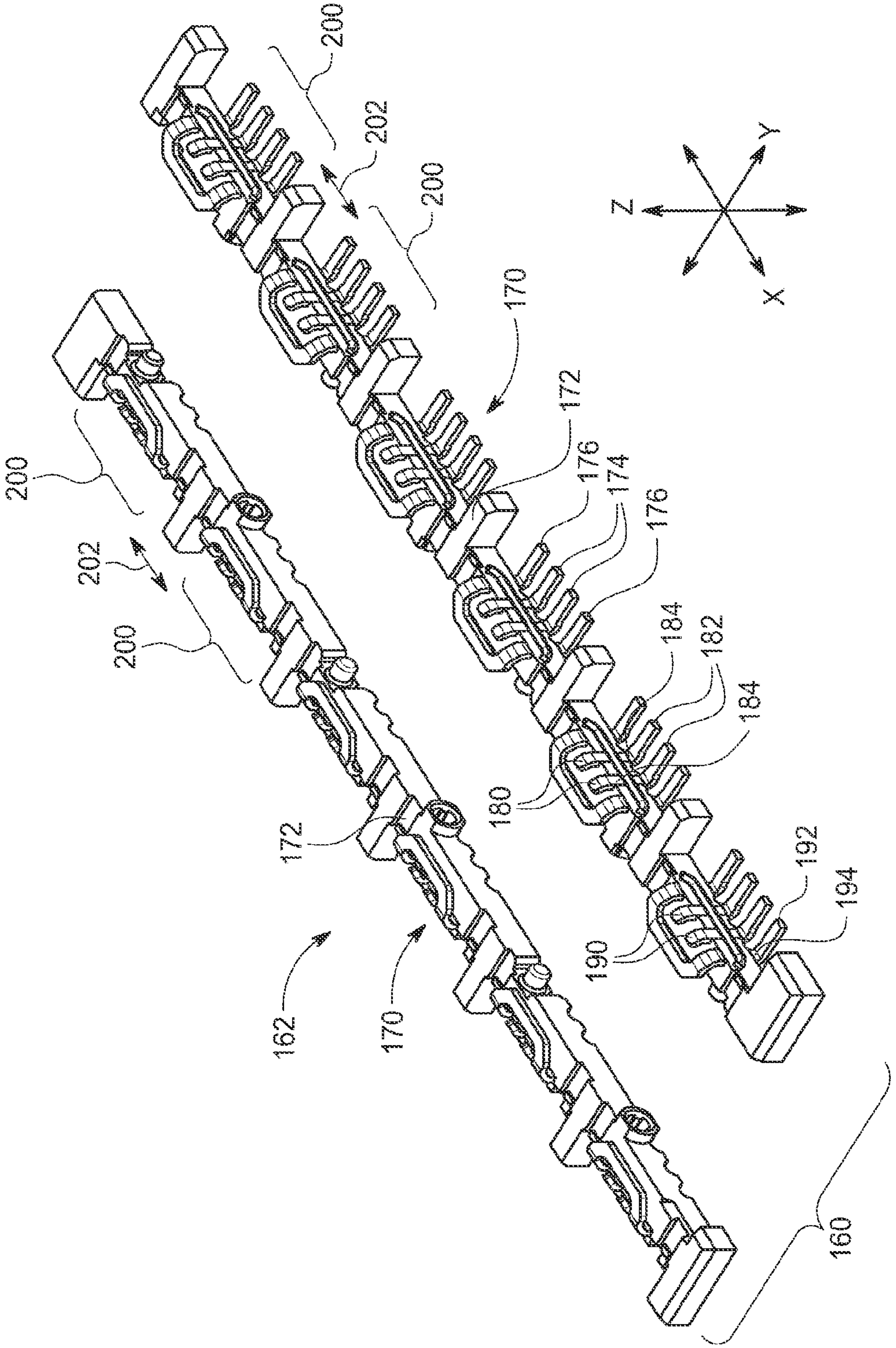
FIG. 10 is a perspective view from of above the terminal subassembly illustrating the two hermaphroditic terminal wafers separated from each other.

Referring to FIGS. 9 and 10, the terminal subassembly 160 can be formed from first and second plug wafers 162, 163 that can be connected together. In an embodiment, the plug wafers 162, 163 can be generally identical to each other and can form a hermaphroditic pair that can be interchangeably connected to each other when aligned in a parallel, opposing relationship. Accordingly, the description of one plug wafer 162 serves as a description of the second plug wafer 163. The adjacent, parallel arrangement of the plug wafers 162, 163 provides the first and second inline terminal rows 114, 116 exposed at the bottom of the plug connector 102. The terminal subassembly 160 can have a subassembly length 164 that generally corresponds with the length of the alignment beam 146 of the plug insulator housing 130. As described below, the terminals may be arranged in terminal groups with the terminal groups of one plug wafer 162 being staggered with respect to the terminal groups of the other plug wafer 163.

Referring to FIGS. 9-12, each individual plug wafer 162, 163 can include a conductive terminal array 170 partially disposed in and supported by a non-conductive terminal support molding 172. In an embodiment, the terminal array 170 may include a plurality of data signal terminals 174 for conducting data signals and a plurality of ground terminals 176. The signal terminals 174 and the ground terminals 176 can be arranged in a side-by-side configuration so that the vertical extension of the terminals are aligned in a common array plane 178. In an embodiment, to transmit differential signaling, the signal terminals 174 can be arranged as differential signal pairs that are disposed between adjacent ground terminals 176. Each pair of the signal terminals 174 can electrically couple together and can transmit a portion of the differential signal; however, other configurations or patterns of signal and the ground terminals 174, 176 are contemplated. The terminal array 170 can be stamped and formed from planar sheet metal with the signal and ground terminals 174, 176 stamped into a three-dimensional shape that is embedded or fit within the terminal support molding 172.

Figure 13:
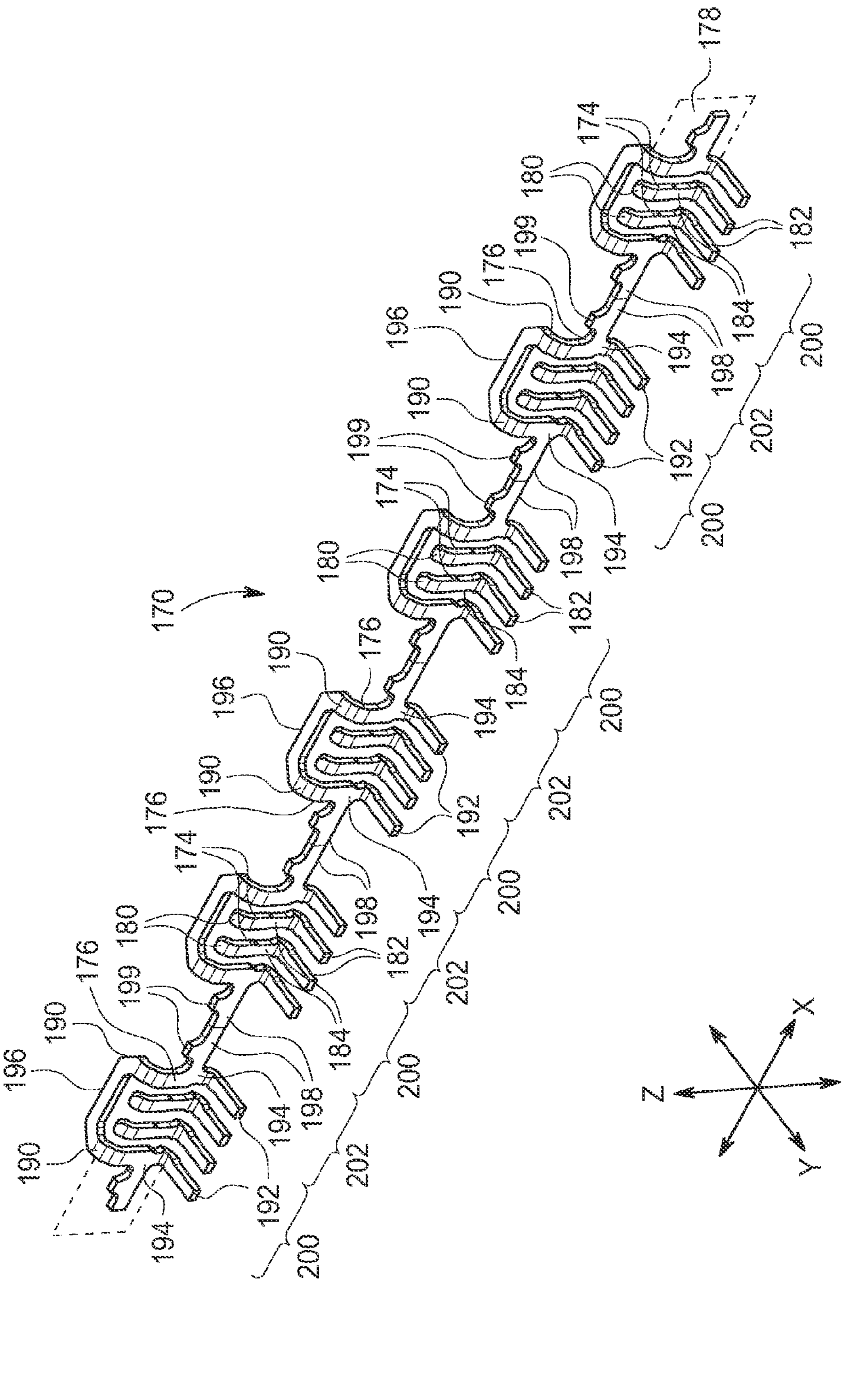
FIG. 13 is a perspective view of a terminal array of the terminal wafer including a plurality of signal terminals and a plurality of ground terminals arranged in terminal groups.

Referring to FIG. 13, which illustrates the terminal array 170 removed from the terminal support molding 172, each signal terminal 174 can include a mating end 180, a mounting end 182, and a mid-body portion 184 extending between the mating end 180 and the mounting end 182. In the illustrated embodiment, the mid-body portion 184 may be planar and may be coplanar with and partially delineate the common array plane 178 of the terminal array 170. The mating end 180 is intended to slide against and make conductive contact with a corresponding signal terminal in the receptacle connector and therefore is formed as an angled end portion to guide and prevent stubbing with the corresponding terminal. The angled end portion of the mating end 180 may, for example, be offset at an angel of approximately 30° with respect to the planar mid-body portion 184 and the common array plane 178. To abut against a conductive pad on the substrate, the mounting end 182 is formed as a surface mount tail that is generally perpendicular to the planar mid-body portion 184 and projects in the opposite direction as the angled end portion at the mating end 180. In the embodiments in which the terminal array 170 is stamped and formed from sheet metal, the signal terminals 174 can have a generally rectangular cross-section.

Each ground terminal 176 can include a mating end 190, a mounting end 192, and a mid-body portion 194 extending between the mating end 190 and the mounting end 192. In the illustrated embodiment, the mid-body portion 194 may be planar and may be coplanar with and partially delineate the common array plane 178 of the terminal array 170. The mating end 180 is intended to slide against and make conductive contact with a corresponding ground terminal from the receptacle connector and therefore can be formed as an angled end portion to guide and prevent stubbing with the corresponding terminal. In an embodiment, the mating ends 190 of neighboring pairs of ground terminals 176 can be connected by a conductive ground bridge 196 that, in part, forms the angled end portion. The ground bridge 196 can be integral with the mating ends 190 and can be made of the same conductive material as the rest of the ground terminal 176. In the embodiment where signal terminals 174 are arranged as differential pairs, the ground bridge 196 can extend laterally (in the lateral direction or x-axis) above and across the mating ends 180 of a differential pair of signal terminals 174. To abut against a conductive pad on the substrate, the mounting end 192 of each ground terminal 176 is formed as a surface mount tail that is generally perpendicular to the planar mid-body portion 194 and projects in the opposite direction as the angled end portion at the mating end 190. In the embodiments in which the terminal array 170 is stamped and formed from sheet metal, the ground terminals 176 can have a generally rectangular cross-section.

In an embodiment, to assist in retaining the ground terminals 176 within the terminal support molding, each ground terminal can include a retention wing 198 projecting laterally (in the lateral direction or x-axis) from the planar mid-body portion 194 of the ground terminal 176. The retention wings 178 can be generally coplanar with the planar mid-body portion 194. In the embodiment where the ground terminals 176 are connected in pairs by the ground bridges 196, the retention wing 198 of each ground terminal 176 may extend from the planar mid-body portion 194 in the opposite lateral direction as the ground bridge 196 and laterally away from the connected ground terminal. The retention wings 198 can each include a lateral ridge 199 formed along and projecting from the upper edges of the wings to further secure the plurality of ground terminals 176 within the terminal support molding. As illustrated in FIG. 13, when the plurality of ground terminals 176 are arranged in the terminal array 170, the laterally extending retention wings 198 of side-by-side ground terminals 176 may abut each other to establish conductive contact.

In the illustrated embodiment, the signal and ground terminal 174, 176 of the terminal array 170 may be arranged in a plurality of terminal groups 200 each including at least one signal terminal 174 and one ground terminal 176. In the differential signaling embodiment, each terminal group 200 can include a differential pair of signal terminals 174 with a corresponding pair of ground terminals 176 located to either lateral side of the signal terminals, wherein the ground terminals are joined by the ground bridge 196. Moreover, the terminal groups 200 may be laterally spaced apart from each other in the terminal array 170 by a uniform pitch distance 202. The pitch distance 202 may be such that the lateral width of the terminal groups 200 and the lateral distance between terminal groups may be the same. The pitch distance 202 can be measured from any suitable point such as between the lateral center point of adjacent terminal groups 200. Any suitable number of terminal groups 200 can be included and the plurality of terminal groups 200 can be laterally spaced along the length of the terminal array 170.

Figure 11:
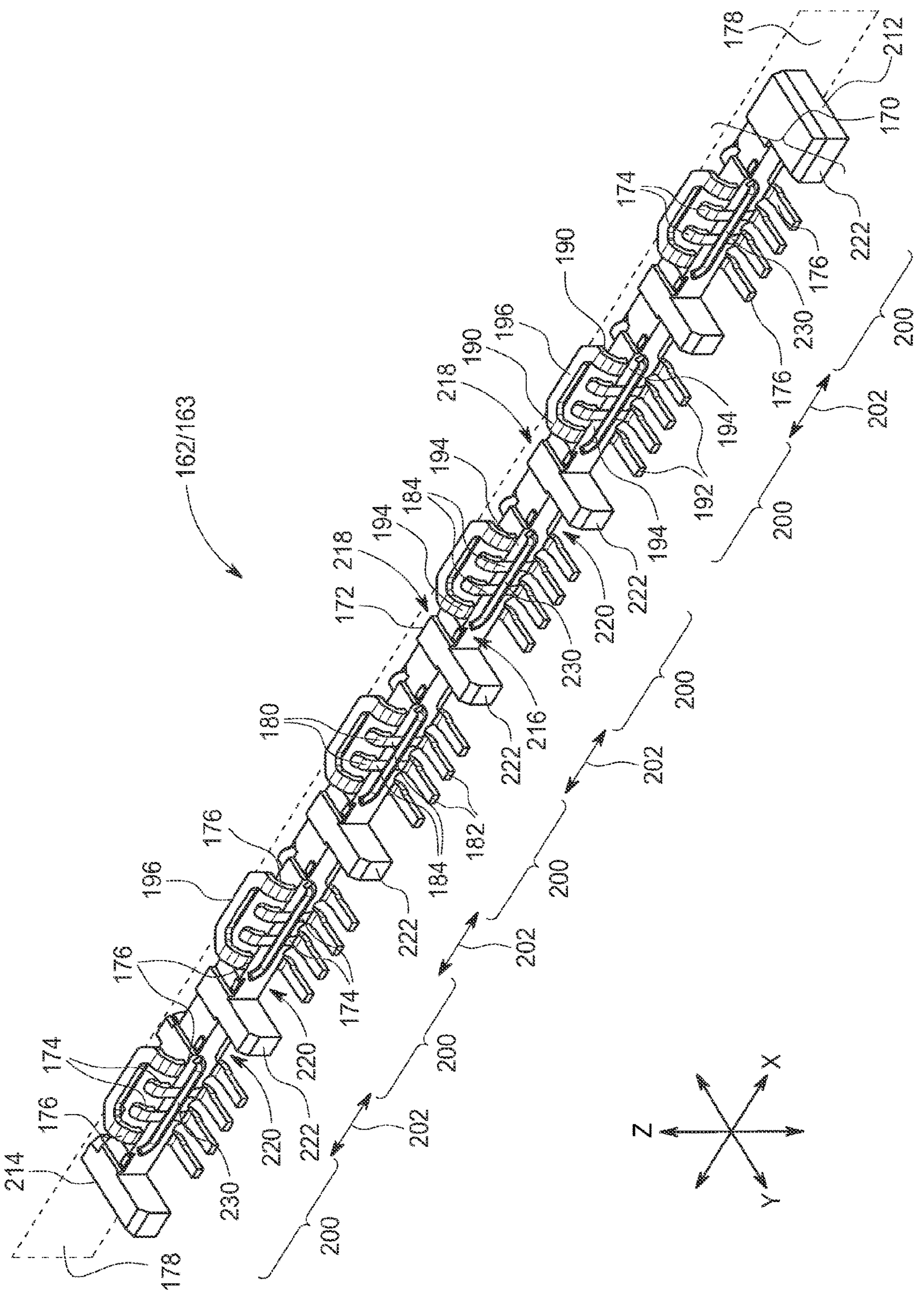
FIG. 11 is a perspective view from the front of a terminal wafer illustrating a conductive terminal array retained in a terminal support molding.
Figure 12:
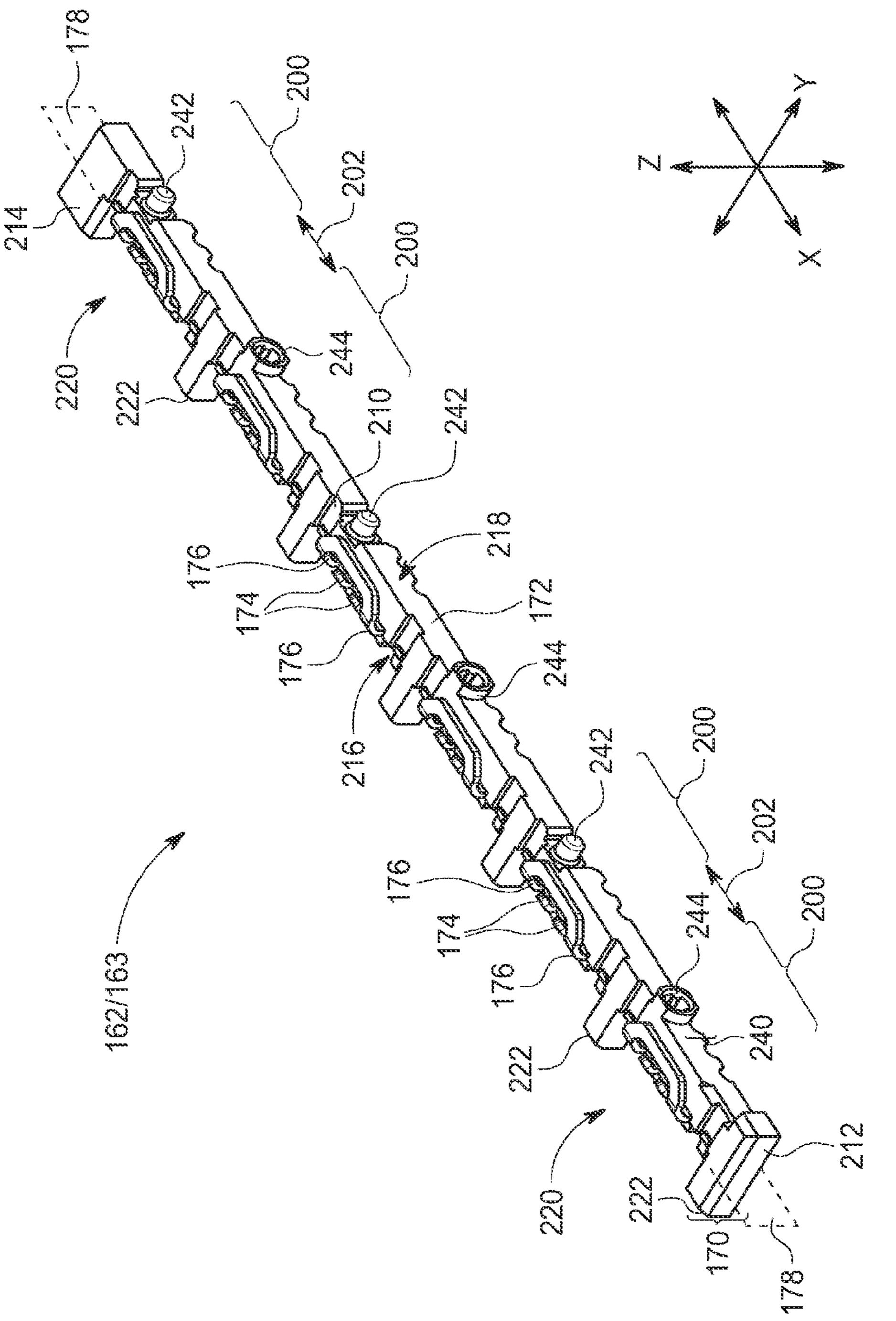
FIG. 12 is a perspective view from the rear of a terminal wafer illustrating the hermaphroditic connecting features on the terminal support molding.

Referring to FIGS. 11 and 12, to retain and maintain the lateral arrangement and spacing between the signal and ground terminals 174, 176, the terminal support molding 172 can partially envelop the terminal array 170. The terminal support molding 172 can be an elongated structure and includes a lateral wafer spine 210 that extends between a first lateral wafer end 212 and a second lateral wafer end 214. It will be appreciated that the wafer spine 210 is coextensive with the lateral dimension of the plug wafers 162, 163. The wafer spine 210 can include a first or forward lateral surface 216 and a second or rear lateral surface 218 that extend between the first and second lateral wafer ends 212, 214. The terminal array 170 can be disposed adjacent the forward lateral surface 216 of the wafer spine 210 and, in an embodiment, the planar mid-body portions 184 of the signal terminals 174 and the planar mid-body portions 194 of the ground terminals 176 may be partially embedded in the material of the wafer spine 210. With the planar mid-body portions 184, 194 of the signal and ground terminals 174, 176 retained in the wafer spine 210, the mating ends 180, 190 may project above the terminal support molding 172 and the mounting ends 182, 192 may project below the terminal support molding 172. The terminal support molding 172 can be made of non-conductive thermoplastic material that is insert molded or over-molded about the stamped and formed terminal array 170 by an appropriate manufacturing process.

In the embodiments in which the signal and ground terminals 174, 176 are arranged in terminal groups 200, the terminal support molding 172 can include a plurality of mold cutouts or mold recesses 220 to accommodate individual terminal groups 200. The mold recesses 220 can be laterally spaced along the length of the wafer spine 210 (in the lateral direction or x-axis) between the first and second lateral wafer ends 212, 214. The mold recesses 220 can be delineated by mold blocks 222 that project perpendicularly forward (in the forward-rearward direction or y-axis) from the forward lateral surface 216 of the wafer spine 200 and that may have a rectangular, block-like shape. A mold block 222 is therefore disposed to either lateral side of each mold recess 220 such that the terminal groups 200 are supported on the wafer spine 210 in an isolated manner.

Figure 14:
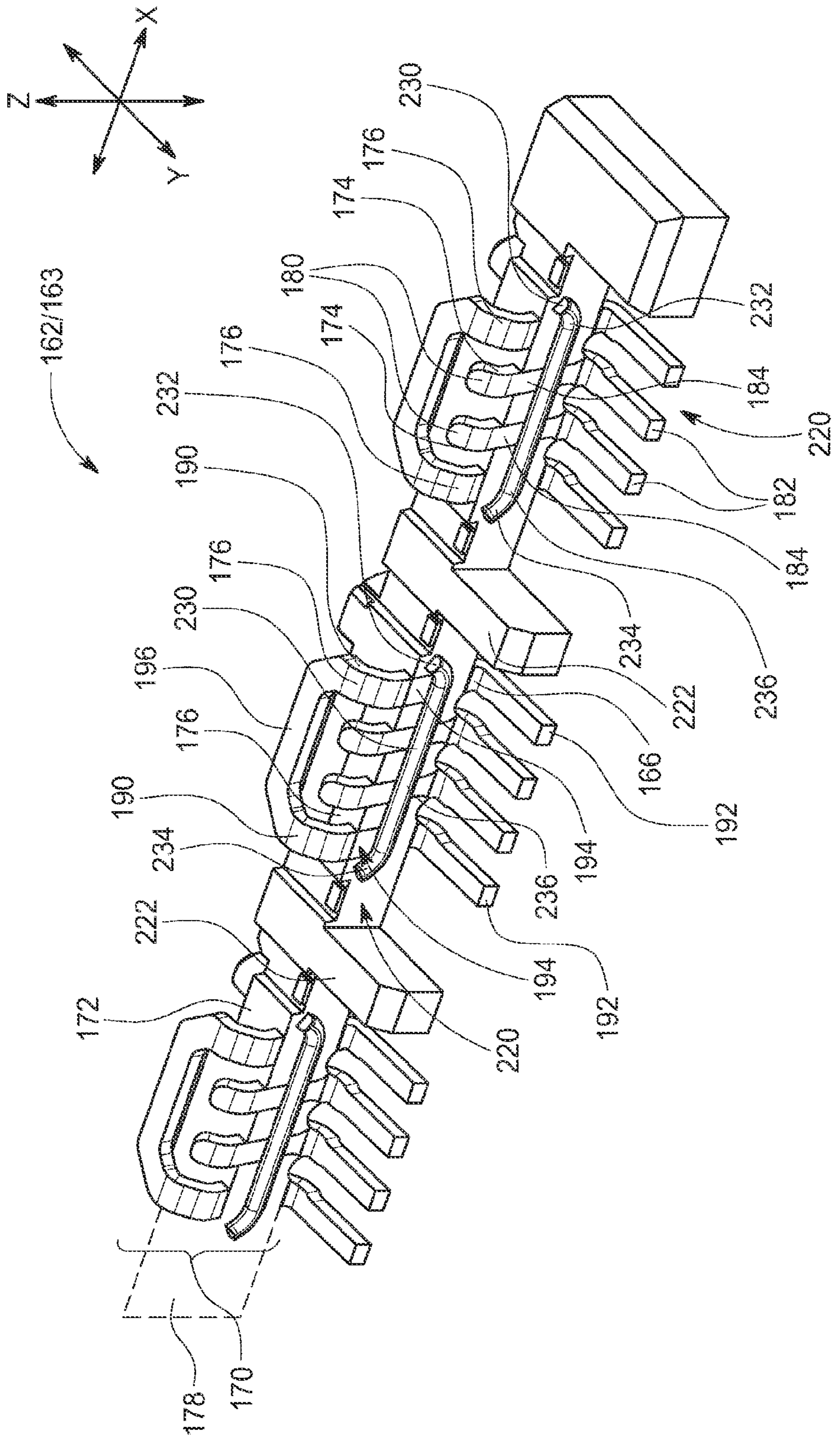
FIG. 14 is a detailed view of terminal wafer with the signal and ground terminals arranged in terminal groups, each terminal group retained to the terminal support molding by a retention bar.

Referring to FIG. 14, in an aspect of the disclosure, to further secure the signal and ground terminals 174, 176 of the terminal array 170 to the terminal support molding 172, a plurality of retention bars 230 can be included that extend about each of the terminal groups 200 located in the mold recesses 220. The retention bar 230 can be a thin elongated, bar-like structure disposed on the forward lateral surface 216 of the wafer spine 210 within each mold recess 220. The retention bar 230 can include a first bar end 232 and a second bar end 234 that are integrally joined to the wafer spine 210 and a rod-like bar body 236 that extends between the first and second bar ends 232, 234. The rod-like bar 236 can be comparatively thinner in cross-section and thickness than the wafer spine 210 to which it is joined. The first bar end 222 can be joined to the wafer spine 210 adjacent a first ground terminal 176 of the terminal group 200 and the second bar end 234 can be joined to the wafer spine 210 adjacent the second ground terminal 176 of the terminal group 200 such that the bar body 236 extends laterally across the planar mid-body portions 184, 194 of the respective signal and ground terminals 174, 176 of the terminal group. In an embodiment, the first and second bar ends 232, 234 may be directed downwardly so that the bar body 236 is disposed toward the mounting ends 182, 192 of the signal and ground terminals 174, 176. The planar mid-body portions 184, 194 of the signal and ground terminals 174, 176 are thereby sandwiched or secured between the forward lateral surface 216 of the wafer spine 210 and the retention bar 230. In an embodiment, the retention bars 230 can be manufactured by the same over-molding process as the terminal support molding 172 and can be made from the same non-conductive material.

In addition to assisting in retaining the signal and ground terminals 174, 176 the terminal support molding 172, the retention bars 230 can also facilitate soldering of the plug wafers 162, 163 to the substrate. In particular, due to the low vertical height of the plug wafer 162, 163, the mounting ends 182, 192 of the signal and ground terminals 174, 176 configured as surface mount tails are in close vertical proximity to the planar mid-body portion 184, 194 and the mating ends 180, 190. During the soldering process, melted solder may tend to wick up the planar mid-body portion 184, 194 of the signal and ground terminals 174, 176 toward the mating ends 180, 190 where the solder could interfere with the mating interface to the receptacle connector, for example, irreversibly binding the mated connectors together. By extending the retention bars 230 across the planar mid-body portions 184, 194 of signal and ground terminals 174, 176, the capillary flow of solder from the mounting ends 182, 192 may be blocked.

As illustrated in FIGS. 9-12 and as stated above, the plug wafers 162, 163 can be hermaphroditic and configured to interlock together as a pair to assemble the terminal subassembly 160. To provide the hermaphroditic configuration, the terminal support moldings 172 can be identical to each other and can include complementary hermaphroditic connecting structures 240 formed along the rear surface 218 of the wafer spine 210. The hermaphroditic connecting structures 240 can include a plurality of posts or pegs 242 that extend perpendicularly from the rear surface 218 of the wafer spine 210. The pegs 242 can be formed as short, cylindrical protrusions and are laterally spaced apart from each along the lateral length (x-axis) of the wafer spine 210. The hermaphroditic connecting structures 240 can also include a plurality of peg apertures 244 disposed perpendicularly into the rear surface 218 of the wafer spine 210 that are complementary in shape and number to the pegs 242 and that are laterally spaced apart along the length of the wafer spine 210. The lateral spacing between pegs 242 and peg apertures 244 may be such that when two identical plug wafers 162, 163 are symmetrically placed in an opposing, parallel relation with the rear surfaces 218 of the wafer spines 210 adjacent each other, the plurality of pegs 242 can be received in the respective plurality of peg apertures 244. In an embodiment where a pair of plug wafers 162, 163 are interlocked or press fit together to form the terminal subassembly 160, the pegs 242 and the peg apertures 244 can be sized to form a friction fit with each other.

In an embodiment, when the terminal subassembly 160 is assembled, the first and second plug wafers 162, 163 may be laterally shifted or offset with respect to each other to complement the staggered configuration of the terminal openings 140 in the insulator plug housing 130. For example, referring to FIGS. 9-12, when the signal and ground terminals 174, 176 are arranged in terminal groups 200 and the terminal groups are spaced apart by the pitch distance 202, the first and second plug wafers 162, 163 may be shifted such that terminal groups 200 of the first plug wafer 162 do not laterally align with the terminal groups 200 in the second plug wafer 163. Rather, the majority of the terminal groups 200 of the first plug wafer 162 are alternatingly interposed between two adjacent terminal groups 200 of the second plug wafer 163 and vice versa. The terminal groups at the lateral ends of the first and second plug wafers will lack a neighboring terminal group to be interposed with. The staggered and interposed relation between terminal groups 200 of the first and second plug wafers 162, 163 may result from shifting the connected plug wafers approximately one-half a pitch distance 202. The pegs 242 and pegs apertures 244 of the hermaphroditic connecting structure 240 can be operatively arranged to effect the offset. Another result of shifting the plug wafers 162, 163 is that the first and second lateral wafer ends 212, 214 are not coextensively aligned but rather are spaced apart with respect to the lateral direction (x-axis). Referring to FIGS. 5-8, when the terminal subassembly 160 is assembled to the plug insulator housing 130, the terminal groups 200 of the offset plug wafers 162, 163 align with and can be received in the offset terminal openings 140 associated with first and second opening rows 142, 144. It will be appreciated that the mounting ends of the signal and ground terminals 174, 176 projecting downwardly (in the vertical z-axis) from the first and second plug wafers 162, 163 corresponding to the first and second parallel inline terminal rows 114, 116 illustrated in FIG. 3.

Figure 15:
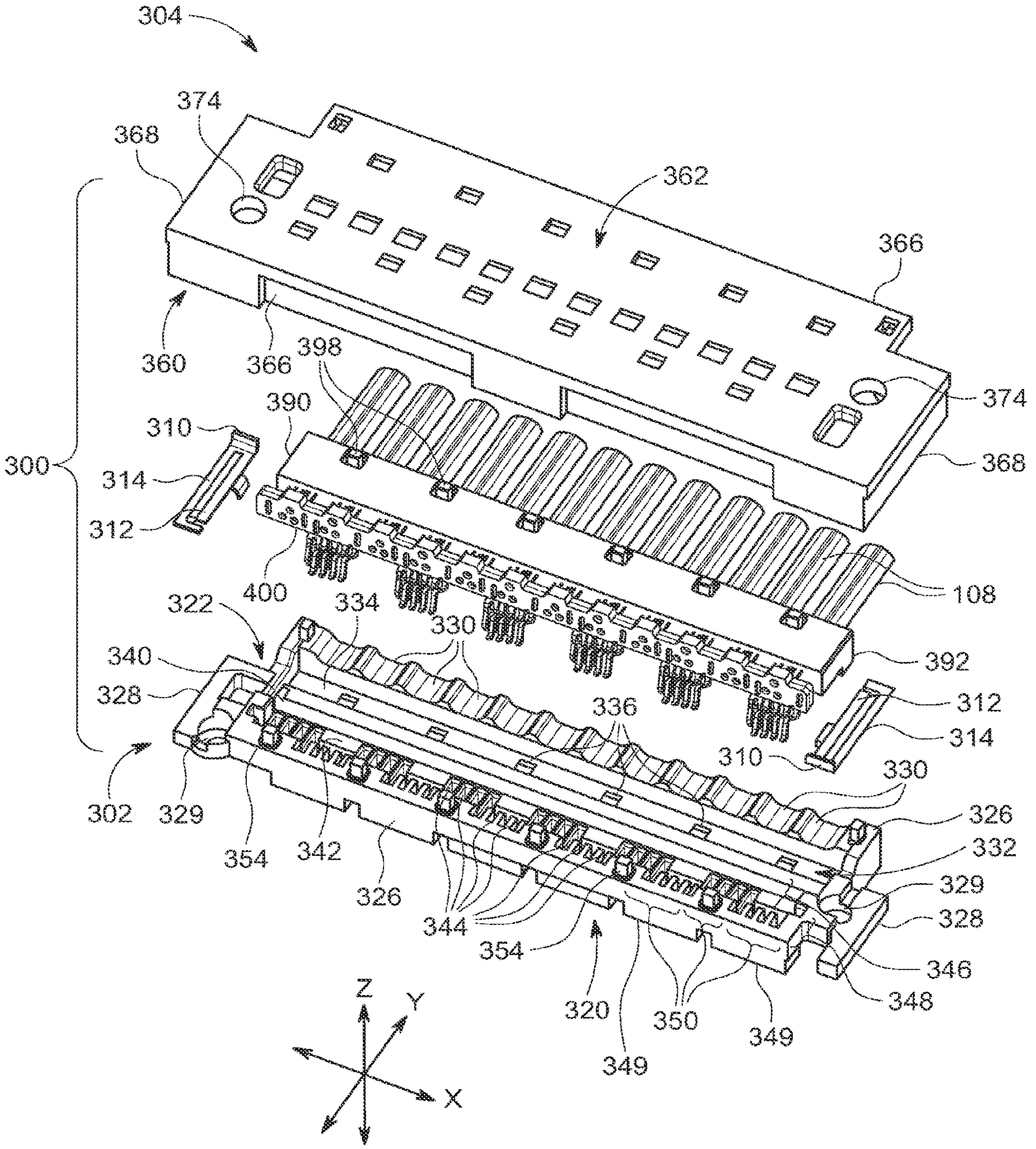
FIG. 15 is a front perspective view from above of the receptacle connector of FIG. 1 illustrating the unassembled lower and upper housing components that accommodate a terminal subassembly to which a plurality of cables are terminated.
Figure 16:
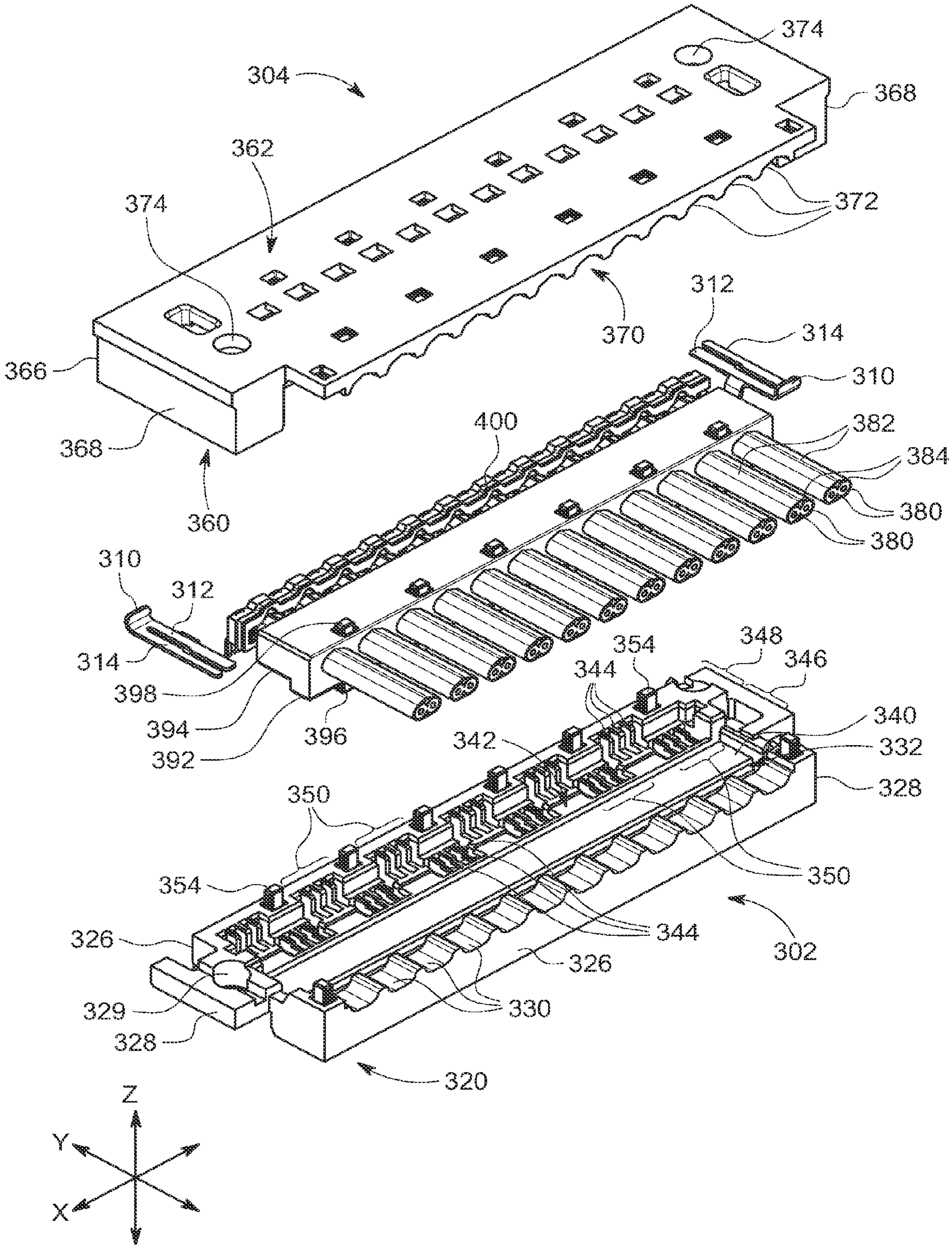
FIG. 16 is a rear perspective view from above of the receptacle connector illustrating the unassembled lower and upper housing components that accommodate the terminal subassembly.
Figure 17:
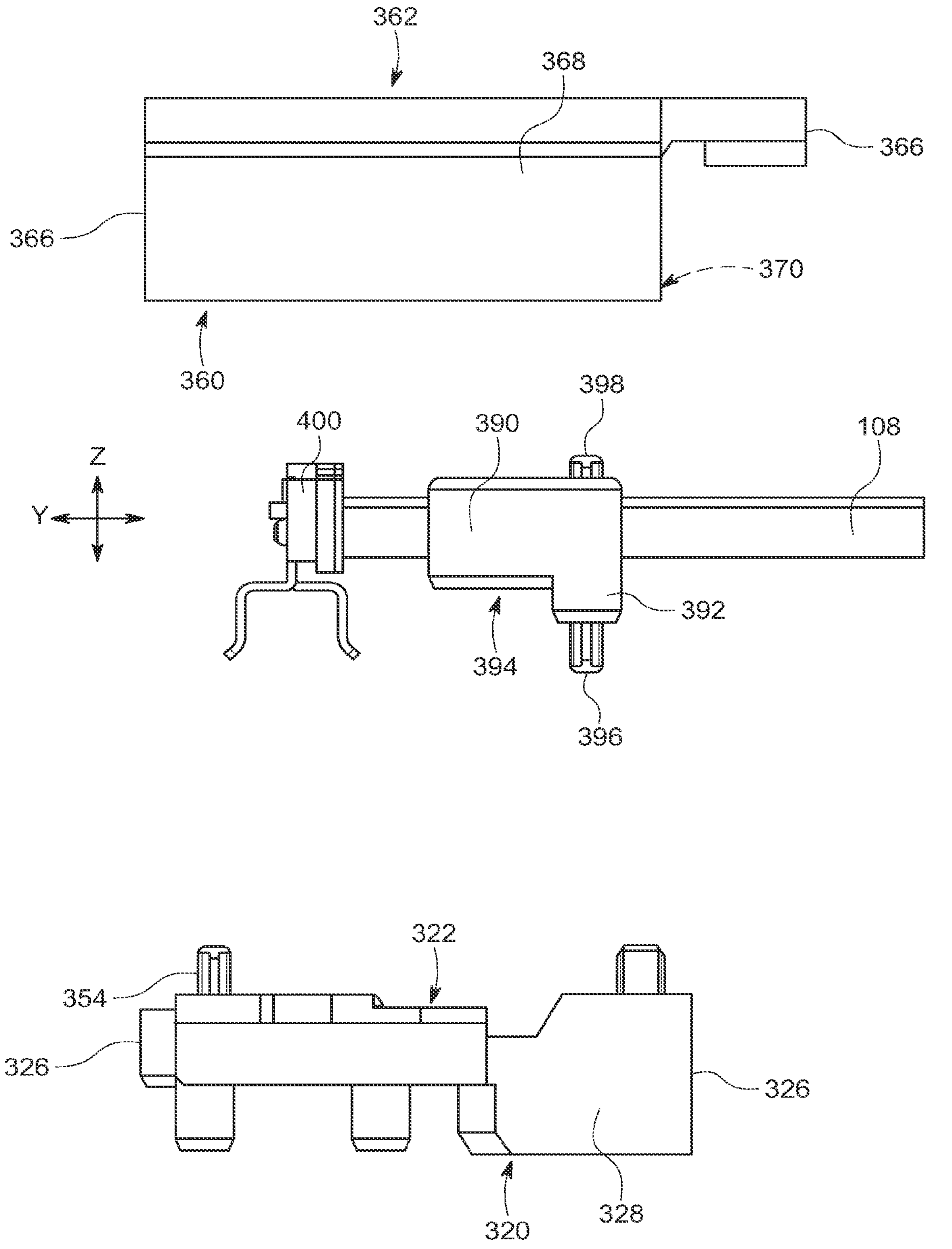
FIG. 17 is a side elevational assembly view of the receptacle connector illustrating the lower and upper housing components that accommodate the terminal subassembly.

Referring to FIGS. 15-17, the receptacle connector 104 is adapted to receive and conductively connect the plurality of cables 108 with the plug connector. The receptacle connector 104 can include a receptacle insulator housing 300 made of non-conductive material such as molded thermoplastic that can accommodate a terminal subassembly 400 to which the plurality of cables 108 are conductively terminated. The receptacle insulator housing 300 can include a lower housing component 302 and an upper housing component 304 also made of non-conductive material that can be mated together in the vertical (z-axis) direction and enclose the terminal subassembly 400. In an embodiment, a nail latch 310 may also be included with the receptacle insulator housing 300 disposed between the lower and upper housing components 302, 304 to interact with the mounting nail and secure the connector assembly to the substrate as described below. The nail latch 310 can be made from stamped sheet metal and may be a rectangular, elongated structure that includes a cantilevered latch arm 312 joined in a bifurcated manner with a latch support 314 that may be a similar elongated arm that extends coextensively about the distal end of the latch arm 312. A slot is disposed between the latch arm 312 and latch support 314 to which the cantilevered latch arm 312 is adapted to springably deflect.

The lower housing component 302 can have a footprint and shape that is smaller than the footprint of the upper housing component 304 and can be configured to fit within a corresponding cavity disposed in the upper housing component 304. The lower housing component 304 includes a lower mating face 320 and an upper, oppositely disposed assembly face 322. The lower housing component 304 is generally rectangular and can include a two parallel elongated sidewalls 326 and two parallel, shorter end walls 328 that are orthogonal to the sidewalls 326 to delineate the rectangular shape. In an embodiment, to accommodate the mounting nails that secure the plug connector to the substrate, the lower housing component 302 can have disposed therein one or more appropriately located nail apertures 329.

The assembly face 322 can be shaped and contoured to manage the plurality of cables 108 and terminals associated with the terminal subassembly 400. To receive and organize the plurality of cables 108, a plurality of cable recesses 330 are disposed laterally (in the x-axis) along the rear sidewall 326 of the lower housing component 302. The plurality of cable recesses 330 can each be rounded or curved depressions disposed into the assembly face 322 and that extend perpendicularly inward from the rear sidewall 326. The number of cable recesses 330 can correspond to the number of cables 108. Also disposed into the assembly face 322 and extending in front of the plurality of cable recesses 330 can be a trough 332, which can be generally rectangular in shape and which terminates at a trough floor 334 spaced above the mating face 320. Disposed into the trough floor 334 can be a plurality of laterally spaced apart alignment recesses 336, which may be rectangular or square in cross-section and that can be disposed from the trough floor 334 through to the mating face 320. Disposed in front of the trough 332 can be a raised shoulder 340 and a terminal platform 342 that correspond to the contour of the assembly face 322 of the lower housing component 302. The raised shoulder 340 can be a planar surface that extends laterally between the opposing end walls 328 of the lower housing component 302.

The terminal platform 342 likewise extends laterally between the opposing end walls 328 and, to accommodate terminals from the terminal subassembly 400, can include a plurality of terminal slots 344 disposed through the lower housing component 302 through to the mating face 320. Each of the terminal slots 344, which are intended to receive one of the terminals, can be rectangular in cross-section and can be arranged in parallel rows and staggered groups. In particular, the terminal slots 344 are laterally arranged in a first slot row 346 proximate to the front sidewall 326 and a parallel second slot row 348 proximate the raised shoulder 340. The terminal slots 344 are further arranged in a plurality of groups 350 that, for example, may include four terminal slots 344 each and that are offset with respect to each other in the first and second slot rows 346, 348. Each of the terminal groups 350 of terminal slots 344 may be associated with a terminal support block 349 that is integrally formed with the lower housing component 302 and that extends downwardly with respect to the mating face 320. The terminal groups 350 of the first slot row 346 are shifted or offset with respect to the terminal groups 350 of the second slot row 348 such that the terminal groups 350 of the first and second slot rows 346, 348 are typically interposed between each other. The terminal groups 350 at the lateral ends of the first and second terminal rows 346, 348 will lack a neighboring terminal group to be interposed with. The alternating arrangement of the terminal groups 350 provides a staggered appearance to the first and second slot rows 346, 348 complimentary to the staggered appearance described above with respect to the plug connector. To align and assemble with the upper housing component 304, the elongated sidewall 326 at the front of the lower housing component 302 can be formed as a raised vertically wall and can include a plurality of alignment projections 354 projecting upwardly from the assembly face 322 that can be received in corresponding recesses disposed in the upper housing component 304.

Referring to FIGS. 15-17, the upper housing component 304 is configured for assembly with the lower housing component 302 and can have a slightly larger footprint to receive and accommodate the lower housing component 302 and the terminal subassembly 400. The upper housing component 304 may also be rectangular in shape and can include an assembly face 360; a parallel, spaced-apart ceiling 362; elongated, parallel front and rear sidewalls 366 and orthogonally arranged shorter parallel end walls 368 which the ceiling extends over. To accommodate the lower housing component 302 and the terminal subassembly 400, a cavity 370 is disposed into the assembly face 360 and is outlined by the orthogonal sidewalls 366 and the end walls 368. To permit passage of the plurality of cables 108 into the cavity 370, a plurality of cable recesses 372 can be formed laterally along the lower edge of the rear sidewall 366 and are complementary in location and shape to the cable recesses 330 of the lower housing component 302. Accordingly, when the lower and upper housing components 302, 304 are assembled, the plurality of cables 108 may be sandwiched between and retained by the cooperating cable recesses 330, 372 of the lower and upper housing components. The lower and upper housing components can be secured together by, for example, a snap-fit structure or the like. In an embodiment, to accommodate the mounting nails, the upper housing component 304 can include one or more nail apertures 374 disposed through the ceiling 362 located generally adjacent the end walls 368.

Referring to FIG. 16, the plurality of cables 108 can be arranged in a lateral row that extends in the forward and rearward (y-axis) direction and perpendicular to the rear sidewalls 326, 366 of the lower and upper housing components 302, 304. The cables 108 can include electrically conductive signal conductors 380 and ground conductors 382. The signal and ground conductors 380, 382 can be relatively flexible to facilitate extending the cables between electrical components and equipment. In addition to signal and ground conductors 380, 382, the cables 108 may include power conductors and other types of conductors. In an embodiment, each cable 108 may be a Twinax cable including two signal conductors 380 made of electrically conductive material such as copper wiring extending the length of the cable that are surrounded by an insulator 384 of non-conductive material. The two signal conductors 380 can be configured to cooperatively transmit differential signals. A ground conductor 382 can also be disposed in the insulator 384 extending adjacent to the signal conductors 380 and may be formed as copper wiring or metal foil that surrounds the signal conductors 380. In other embodiments, the plurality of cables 108 can have different numbers or configurations of signal and ground conductors; for example, the cables may be coaxial cables.

To manage the plurality of cables 108 with respect to the terminal subassembly 400 and direct the cables into the receptacle insulator housing 104, a laterally elongated cable over-mold 390 made of non-conductive material can be disposed laterally across the cables by an over-molding process. The cable over-mold 390 can have a step-like structure including a rectangular lower projection 392 that extends below a floor 394 of the body of the cable over-mold 390. Protruding downwards from the lower projection 392, perpendicular to the orientation of the plurality of cables 198, can be a plurality of alignment projections 396 that are generally rectangular block-like structures and that can be laterally spaced apart along the cable over-mold 390. A similar plurality of alignment projections 398 can project upwards from the top surface of the cable over-mold 390. When the receptacle connector 104 is assembled, the plurality of cables 108 can align with and be received by the cable recesses 330, 372 in the lower and upper housing components 302, 304 that provide access to the cavity 370 of the upper housing component. The lower projections 392 can be received in the trough 332 disposed into the assembly face 322 of the lower housing component 302 and the floor 394 of the cable over-mold 390 can abut against the raised shoulder 340 of the assembly face 322. Moreover, the alignment projections 396 extending from the lower projection 392 can be received in the alignment recesses 336 that are disposed in the trough floor 334. Likewise, the alignment projections 398 projecting upwards on the cable over-mold 390 can be received in corresponding alignment recesses formed in the upper housing component 304. The fit between the alignment projections 396, 398 on the cable over-mold 390 and corresponding alignment recesses disposed in the lower and upper housing components 302, 304 functions as a mechanical strain relief and prevents the cables 108 from being unintentionally pulled from the receptacle connector 104.

The terminal subassembly 400 to which the plurality of cables 108 terminates can be located in front of the cable over-mold 390. Referring to FIGS. 18-21, the terminal subassembly 400 includes a receptacle wafer 402 configured for reception between the lower and upper housing components. In an aspect of the disclosure, the receptacle connector 104 may include a single receptacle wafer compared to first and second plug wafers of the plug connector 102. The receptacle wafer 402 includes a conductive terminal array 404 partially disposed in a terminal support molding 406 of non-conductive material. The receptacle wafer 402 may be an elongated structure and may define a wafer plane 408 as further described below. The terminal array 404 can include a plurality of signal terminals 410 for conducting data signals and a plurality of ground terminals 412 for shielding and/or providing a conductive return path. In an embodiment, to transmit differential signaling, the signal terminals 410 can be arranged as differential pairs that can electrically couple together to transmit a portion of the differential signal. For isolating the differential pairs, a ground terminal 412 can be disposed between each pair of differential signal terminals 410. In other embodiments, other configurations or patterns of signal and ground terminals 410, 412 are contemplated.

Figure 22:
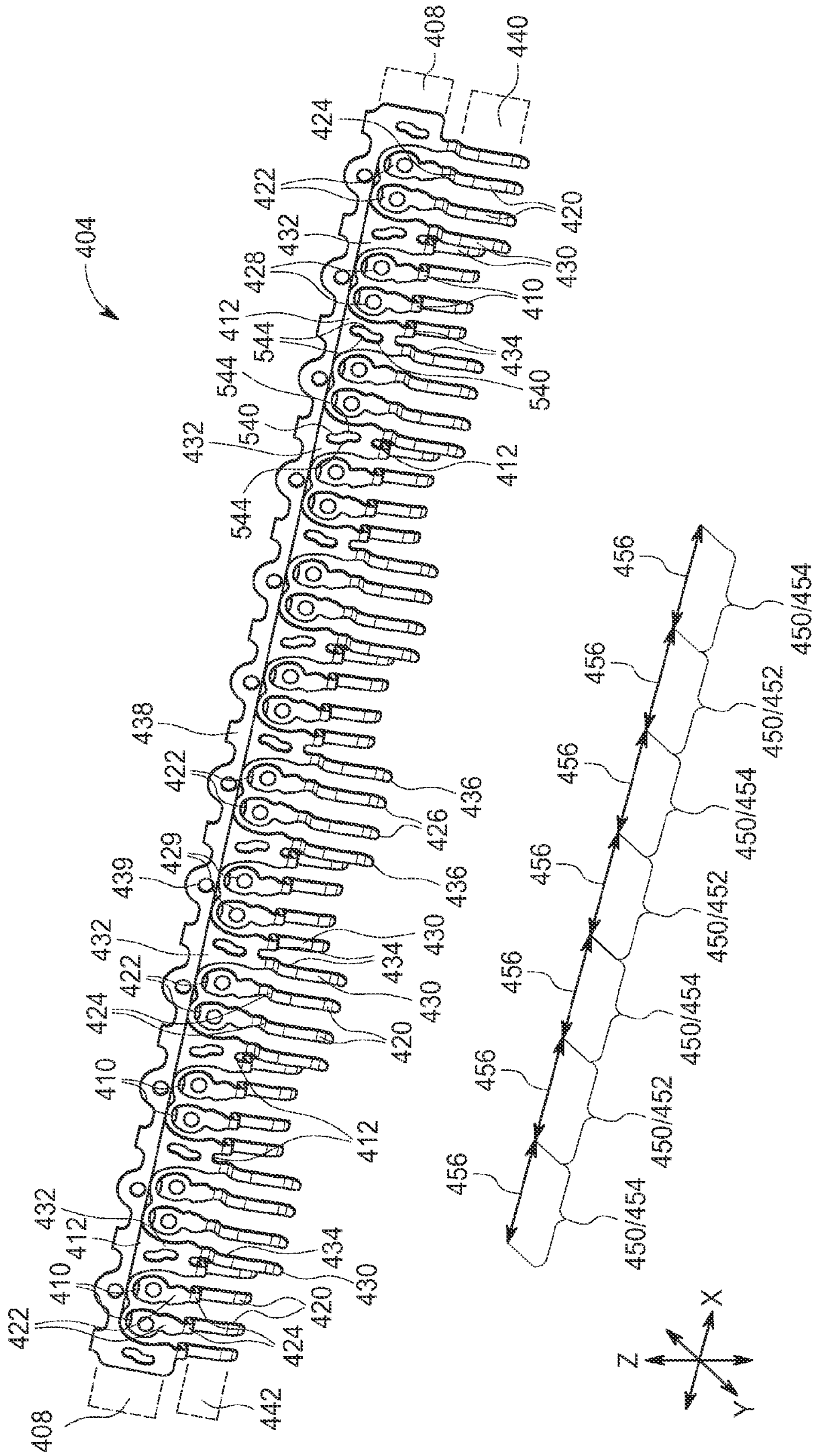
FIG. 22 is a perspective view from the front of the terminal array for the terminal wafer of the receptacle connector illustrating the plurality of signal and ground terminals.

Referring to FIG. 22, which illustrates the terminal array 404 removed from the terminal support molding, each signal terminal 410 can include a mating end 420, a termination end 422 opposite the mating end 420, and a mid-body portion 424 connecting the mating end and the termination end. The mating end 420 is intended to slide against and conductively contact a corresponding signal terminal in the plug connector and therefore can be formed as a finger beam with an inclined distal end 426 that can exhibit a cantilevered spring-like characteristic to deflect with respect to and urge against the respective signal terminal. The termination end 422 of each signal conductor is intended to conductively connect to and terminate a signal conductor from the plurality of cables and can include a conductor termination hole 428 disposed through it. In addition, the planar termination ends 422 of the plurality of signal terminals 410 can be coplanar with the common wafer plane 408 such that the conductive termination hole 428 is disposed perpendicularly into the termination end.

Each ground terminal 412 can include a mating end 430, a termination end 432 opposite the mating end, and a mid-body portion 434 connecting the mating end and the termination end. The mating end 430 is intended to slide against and conductively contact a corresponding ground terminal in the plug connector and therefore can be formed as a finger beam with an inclined distal end 436 that can exhibit a cantilevered spring-like characteristic to deflect with respect to and urge against the respective ground terminal. In the illustrated embodiment, to enable the ground terminals 412 to connect with and terminate ground conductors from the plurality of cables, the termination ends 432 of the plurality of ground terminals 412 can be integrally formed with and are electrically interconnected by a conductive ground rail 438 that extends laterally across the terminal array 404. In particular, the ground rail 438 extends above and across the termination ends 422 of the differential pairs to electrically isolate the signal terminals 410. Disposed into the ground rail 438 can be a plurality of conductor termination holes 439 that can receive and terminate a ground conductor from the cables. The conductor termination holes 439 in the ground rail 438 can each be located above and between the conductor termination holes 428 of the signal terminals 410 so the termination holes delineate a triangular outline. In addition, the termination ends 432 of the ground terminals 412 and the ground rail 438 can be coplanar with the common wafer plane 408 so the conductive termination holes 439 are perpendicular to the ground terminal and ground rail.

To enable the signal and ground terminals 410, 412 from the receptacle wafer 402 to establish electrical communication with the signal and ground terminals in the first and second plug wafers, the mating ends 420, 430 of the ground and signal terminals 410, 412 may be offset in either of a first offset terminal plane 440 or a second offset terminal plane 442. The first and second offset terminal planes 442, 440 may be parallel to each other and may be spaced apart from each other with respect to the forward-rearward (y-axis) direction. Further, the first and second offset terminal planes 440, 442 may be planar to and offset from the common wafer plane 408 associated with the receptacle wafer 402 to which the termination ends 422, 432 of the signal and ground terminals 410, 412 are coplanar. To position the mating ends 420, 430 of the signal and ground terminals 410, 412 in either the first or second offset terminal planes 440, 442, the mid-body portions 424, 434 of the terminals can be formed as offset mid-body portions. For example, referring to FIGS. 18, 20, and 22, the offset mid-body portion 424 of the signal terminal 410 can be joined generally perpendicularly to the mating end 420 and the termination end 422 to traverse the distance between the common wafer plane 408 and the first and second offset terminal planes 440, 442. Likewise, the offset mid-body portion 434 of the ground terminal 412 can be joined generally perpendicularly to the mating end 430 and the termination end 432 to traverse the distance between the common wafer plane 408 and the first and second offset terminal planes 440, 442. The offset mid-body portions 424, 434 are thus aligned in the forward-rearward (y-axis) direction. Accordingly, unlike the planar mid-body portions of the signal and ground terminals associated with the plug wafers, the offset mid-body portions 424, 434 of the signal and ground terminals 410, 412 of the receptacle wafer 402 are normal to the relevant common wafer plane 408 and the first and second offset terminal planes 440, 442.

To cooperatively mate with the plurality of terminal groups associated with the first and second plug wafers, the signal and ground terminals 410, 412 may also be arranged in a plurality of terminal groups 450 with at least one signal terminal 410 and one ground terminal 412 per terminal group 450. In the differential signaling embodiment, each terminal group 450 can include a differential pair of signal terminals 410 and a corresponding pair of ground terminals 412 located to either lateral side of the signal terminal pairs, wherein the ground terminals are joined by the ground rail 438. Furthermore, to realize the first and second offset terminal planes 440, 442, the plurality of terminal groups 450 may be further arranged in a plurality of first terminal subgroups 452 operatively associated with the first offset mounting plane 440 and a plurality of second terminal subgroups 454 operatively associated with the second offset mounting plane 442. In particular, the offset mid-body portions 424, 434 of the signal and ground terminals 410, 412 of the first terminal subgroups 452 may project forward from the common wafer plane 408 to dispose the respective mating ends 420, 430 in the first offset mounting plane 440. Likewise, the offset mid-body portions 424, 434 of the signal and ground terminals 410, 412 of the second terminal subgroups 454 may project rearward from the common wafer plane 408 to disposed the respective mating ends 420, 430 in the second offset mounting plane 442.

The plurality of first terminal subgroups 452 may be laterally spaced from each other by a pitch distance 456 and the plurality of second terminal subgroups 454 may also be laterally spaced from each other by the pitch distance 456. The pitch distance 456 can be measured from any suitable point such as between the lateral center point of adjacent terminal subgroups 452, 454. The pitch distance 456 may dimensionally correspond with the pitch distance associated with the first and second plug wafers. Moreover, the first terminal subgroups 442 may alternate (in the lateral direction or x-axis) with the second terminal subgroups 454 so that the receptacle wafer 402 has an alternating arrangement of terminals associated with either first offset terminal plane 440 or the second offset terminal plane 442. Because the first terminal subgroups 442 are spaced apart by the pitch distance 456 and the second terminal subgroup 454 are spaced apart by the pitch distance 456, and because of the alternating arrangement of the first and second terminal subgroups 452, 454, the majority of the first terminal subgroups 452 are typically laterally interposed between two second terminal subgroups 454 and the second terminal subgroups 454 are typically laterally interposed between two first terminal subgroups 452. The terminal subgroups at the lateral ends of the receptacle wafer will lack a neighboring terminal subgroup.

In the differential signaling embodiments, to enable a ground terminal 412 to be positioned between adjacent differential pairs of signal terminals 410, the ground terminals 412 may be bifurcated along the mating ends 430 and the offset mid-body portions 434. In particular, the same bifurcated ground terminal 412 may have a common termination end 432 with the bifurcated mid-body portions 434 projecting alternatively toward either the first offset terminal plane 440 or the second offset terminal plane 442. The two portions of the bifurcated mating ends 430 of the same ground terminal 412 are alternatively disposed in the first and second offset terminal planes 440, 442. The bifurcated ground terminals 412 of the receptacle wafer 402 facilitates the arrangement of the first terminal subgroup 452 and the second terminal subgroup 454 alternatively in the respective first and second offset terminal planes 440, 442. As such, a bifurcated ground terminal may simultaneously physically and electrically contact a ground terminal associated with the first plug wafer and a ground terminal associated with the second plug wafer when the receptacle connector 104 is mated to the plug connector. At the lateral ends of the receptacle wafer 402, bifurcated ground terminals are unnecessary.

The terminal support molding 406 can be disposed about the terminal array 404 of the receptacle wafer 402 and can extend laterally between a first lateral wafer end 460 and an opposite second lateral wafer end 462 to delineate a subassembly length 464 of the terminal subassembly 400. The subassembly length 464 may be coextensive with the subassembly length of the terminal subassembly of the plug connector. The terminal support molding generally embeds or encases the termination ends 422, 432 of the signal and ground terminals 410, 412 such that the offset mid-body portions 424, 434 and the mating ends 420, 430 can extend from a lower surface of the terminal support molding 406. To provide access to the conductor termination holes 428, 439 associated with the signal and ground terminals 410, 412, the terminal support molding 406 may have aligned apertures 468 disposed in the rear surface. In an embodiment, the terminal support molding 406 can be insert molded or over-molded about the stamped and formed terminal array 404 by an appropriate manufacturing process.

Figure 23:
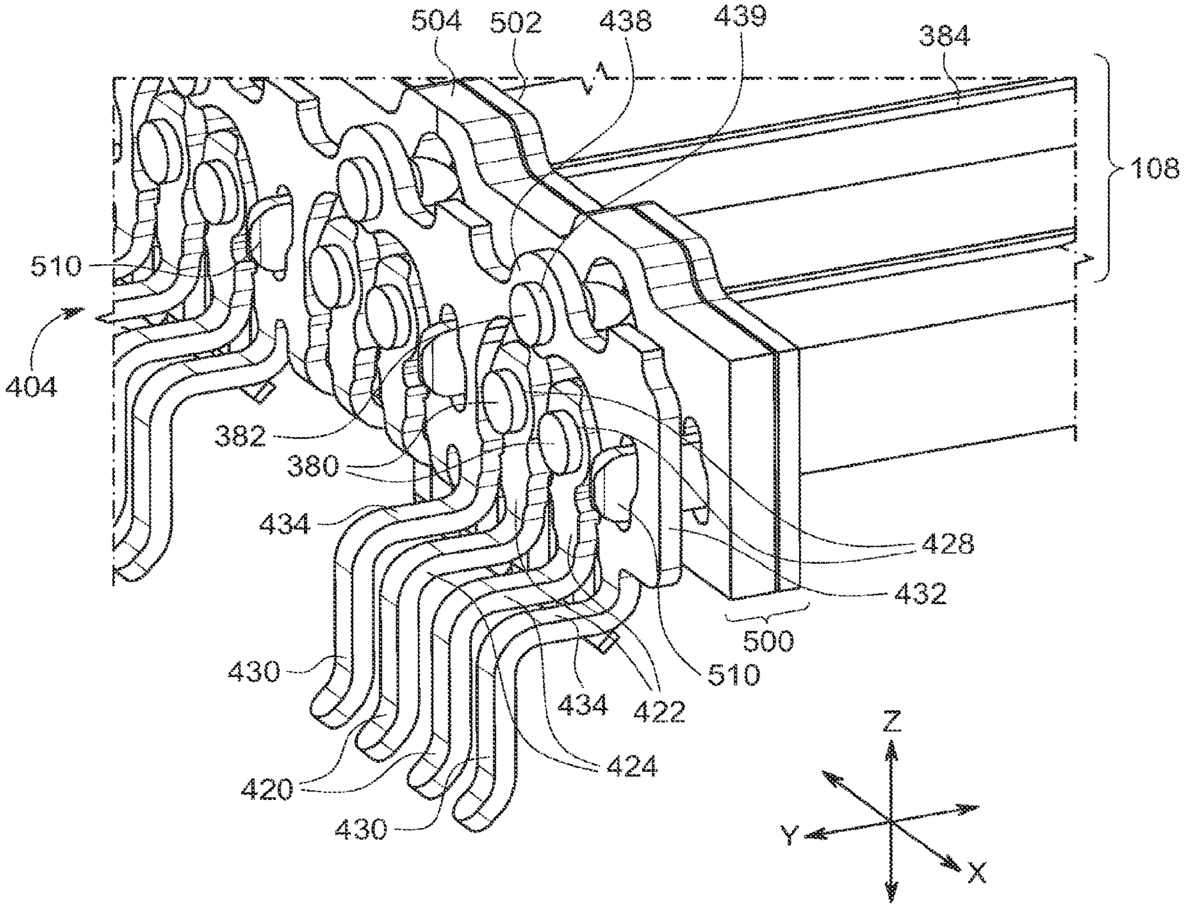
FIG. 23 is perspective view of the terminal wafer of the receptacle connector illustrating a cable terminated to the terminal array.

Referring to FIG. 23, the cables 108 can be received by and terminated in the receptacle wafer 402. In particular, the insulator 384 can be removed from the ends of the cables 108 to expose the signal conductors 380 and the ground conductors 382. The signal conductors 380 can be inserted into the conductor termination holes 428 of the signal terminals 410 and the ground conductors 482 can be inserted into the conductor termination holes 439 of the ground terminals 412. The ends of the signal conductors 380 and the ends of the ground conductors 382 can be bonded in the respective conductor termination holes 428, 439 by, for example laser welding to establish an electrically conductive connection between the cables 108 and the terminal array 404. Because the ground terminals 412 are interconnected at their termination ends 432 by the conductive ground rail 438, the ground conductors 412 are all conductively interconnected and establish a common electrical ground.

Referring to FIGS. 18-21, the receptacle terminal subassembly 400 can include a conductive ground shield 500 disposed on the receptacle wafer 402 that provides additional electromagnetic shielding for the connector assembly. The ground shielding 500 is a flat, planar structure that is disposed adjacent to the rear of the receptacle wafer 402. In particular, the ground shield 500 can extend laterally (in the lateral direction or x-axis) between the first and second lateral wafer ends 460, 462 of the terminal support molding 406 and can be coextensive with the wafer length 464. In an embodiment, the ground shielding 500 can be made from stamped and formed sheet metal or metal plates. In another embodiment, the ground shielding can be made from a metal injection molding process in which metal powder is mixed with a binder and molded into a finished part having conductive properties due to the metal powder. In another embodiment, the ground shielding 500 can be formed from metalized plastic in which a molded plastic part is coated with metal to impart conductive properties.

When attached to the rear of the receptacle wafer 402, the ground shielding 500 is parallel to the common wafer plane 408 and the first and second offset terminal planes 440, 442 associated with the arrangement of the signal and ground terminals 410, 412 of the terminal array 404. In an embodiment, the ground shielding 500 can be assembled from a relatively thin, flat projection plate 502 and a relatively thicker intermediate plate 504. To interconnect with the terminal array 404 of the receptacle wafer 402, the projection plate 502 can include a plurality of grounding projections 510 that extend perpendicularly from the plane of the projection plate 502 and thus perpendicularly with respect to the common wafer plane 408 and the first and second offset terminal planes 440, 442. The grounding projections 510 can be laterally spaced along the lateral length of the ground shielding 500 and can correspond in number and location with the plurality of ground terminals 412 in the receptacle wafer 402. In an embodiment, the grounding projections 510 can be grounding tabs that are aligned in a vertical orientation (with respect to the vertical z-axis) and can have an associated vertical height 512. To produce the grounding projections 510, in an embodiment, the projection plate 502 can be made from sheet metal and the tabs that correspond to the grounding projections 510 can be flaps that are stamped or punched from and integral to the projection plate 502. Punching of the grounding projections 510 from the projection plate 502 results in rectangular tab openings 514 being formed in the projection plate 502 between adjacent grounding projections 510. In other embodiments, the grounding projections 510 can have other suitable shapes and configurations.

To allow cables from the cable plurality to pass through the ground shielding 500, a plurality of cable openings 516 are disposed through the projection plate 502. The cable openings 516 can be generally triangular or pear-shaped to match the triangular outline of the conductor termination holes 428, 439 disposed into the signal terminals 410 and the ground terminals 412 of the receptacle wafer 402. The cable openings 516 therefore accommodate the triangular arrangement of the signal and ground conductors of the Twinax cables. The cable openings 516 can be positioned between laterally adjacent grounding projections 510 extending from the projection plate 502

The thicker intermediate plate 504 can be made from conductive material such as a stamped metal plate or may be cast or sintered metal. The intermediate plate 504 is also laterally coextensive with the wafer length 464 of the receptacle wafer 402 and extends between the first and second lateral wafer ends 460, 462 of the terminal support molding 406. The intermediate plate 504 can have a thickness 520 that provides the relative bulk of the intermediate plate with respect to the thinner projection plate 502. To allow passage of the cables of the first cable plurality, the intermediate plate 504 includes a plurality of cable openings 522 that are aligned with and similar in shape to the plurality of cable openings 516 disposed in the projection plate 502.

To allow the grounding projections 510 from the projection plate 502 to extend to and connect with the ground terminals 412 of the receptacle wafer 402, the intermediate plate 504 can include a plurality of slots 524 that are arranged in a lateral row across the intermediate plate 504. The plurality of slots 524 extend through the body of the intermediate plate 504 and are oriented perpendicularly toward the common wafer plane 408 of the receptacle wafer 402. The slots 524 can correspond in number and alignment with the plurality of grounding projections 510. In the embodiment where the grounding projections 510 are formed as vertical tabs with an associated vertical tab height 512, the slots 524 can have similar dimensions to allow for passage of the tabs through the intermediate plate 504.

Figure 18:
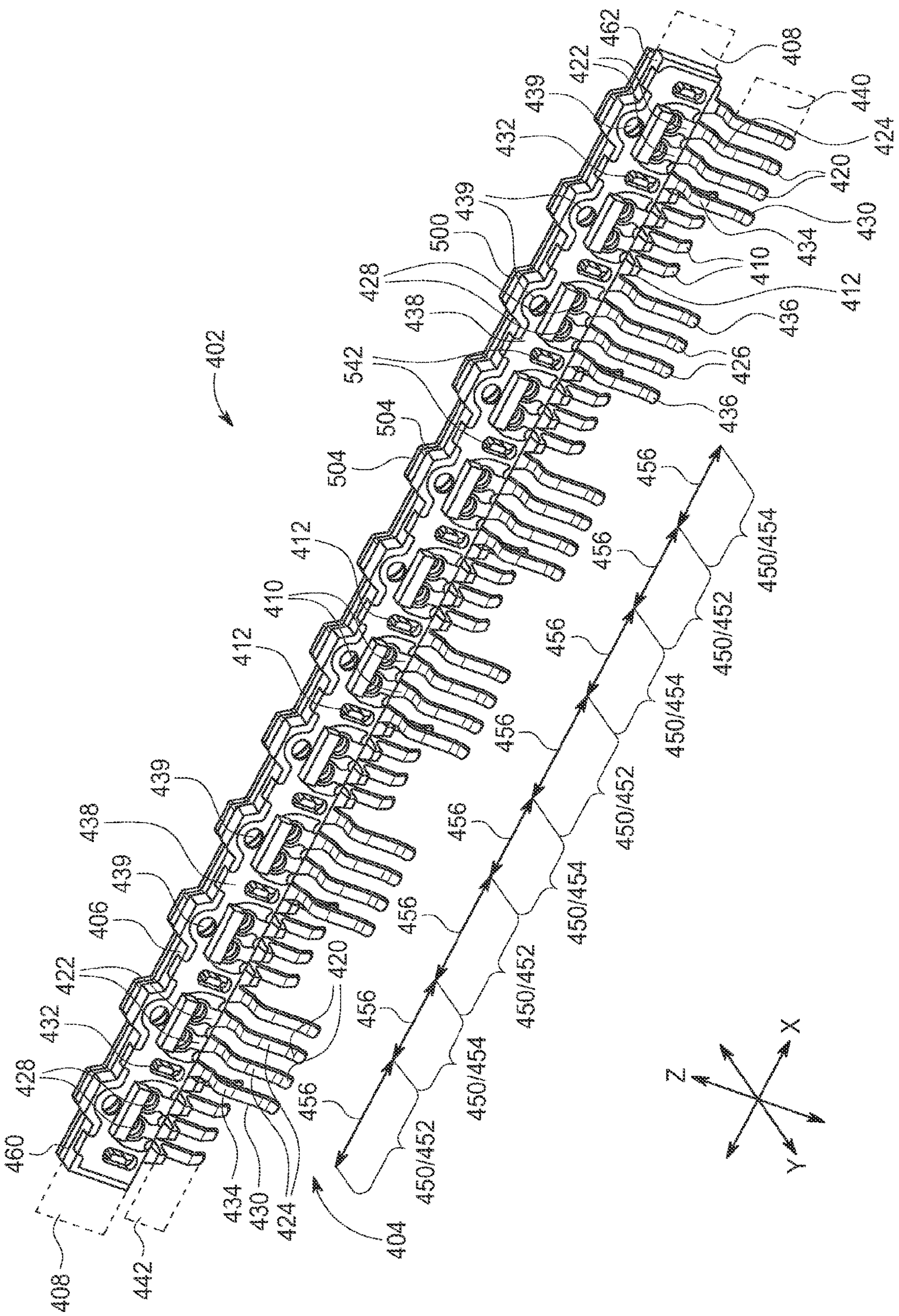
FIG. 18 is a perspective view from the front of a terminal wafer of the receptacle connector illustrating a terminal array partially embedded in a terminal support molding.
Figure 19:
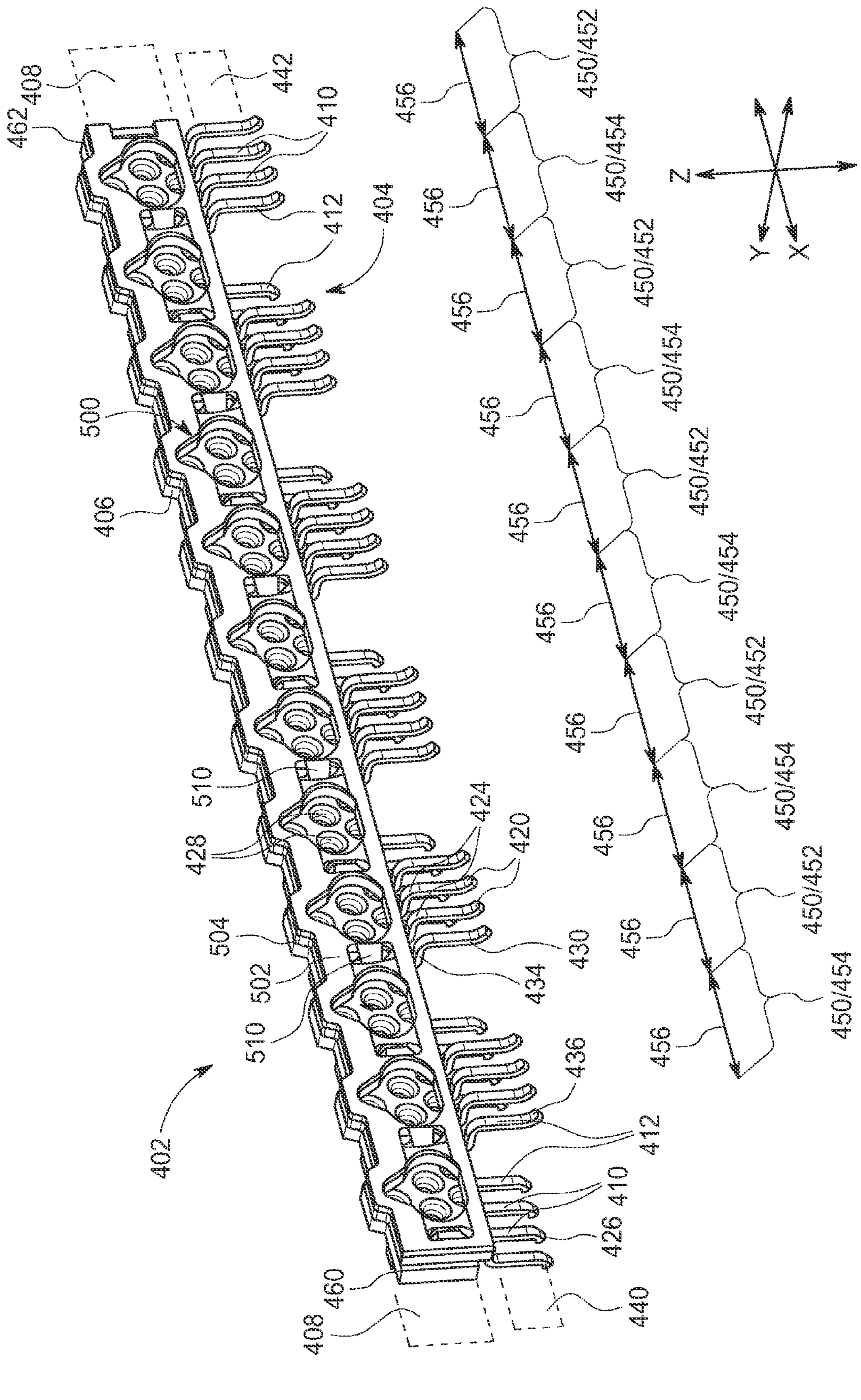
FIG. 19 is a perspective view from the rear of the terminal wafer of the receptacle connector illustrating a conductive ground shielding attached adjacent thereto.

To mechanically and electrically connect with the grounding projections 510 from the ground shielding 500, a plurality of grounding apertures 540 can be disposed in the terminal array 404 of the receptacle wafer 402. For example, as illustrated in FIGS. 18-19, the grounding apertures 540 can be disposed in the termination end 432 of each ground terminal 412 of the terminal array 404 immediately below the ground rail 438 that extends across the terminal array. The number and alignment of the grounding apertures 540 can correspond to the number and alignment of the first plurality of grounding projections 510. Because the termination ends 432 of the ground terminals 412 are embedded in the terminal support molding 406, material may be removed from the terminal support molding proximate the termination ends to provide projection openings 442 that expose the grounding apertures 540 to the grounding projections 510 as illustrate in FIG. 21.

Figure 20:
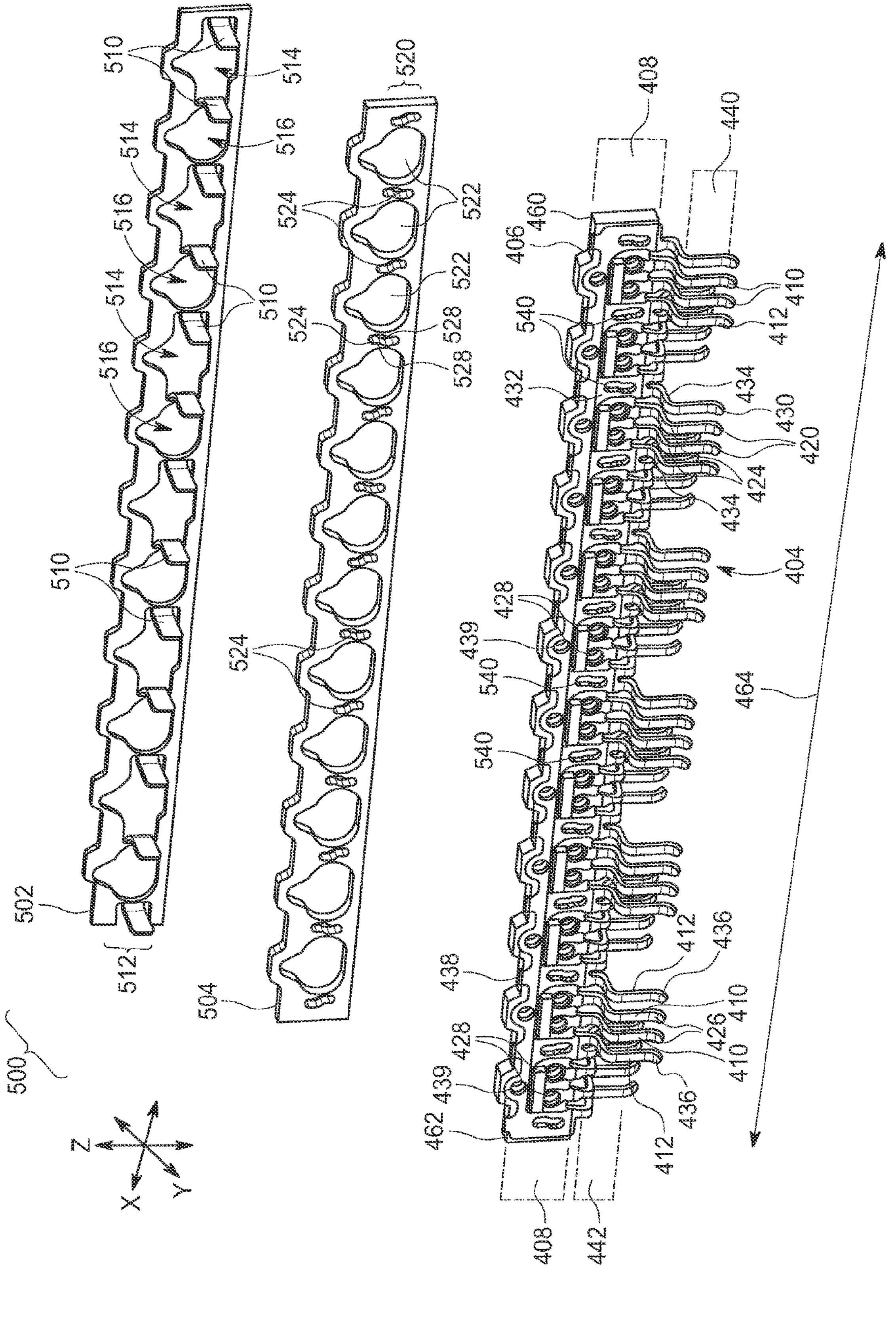
FIG. 20 is a perspective assembly view from the front of the terminal wafer of the receptacle connector illustrating the conductive ground shielding in relation thereto.
Figure 21:
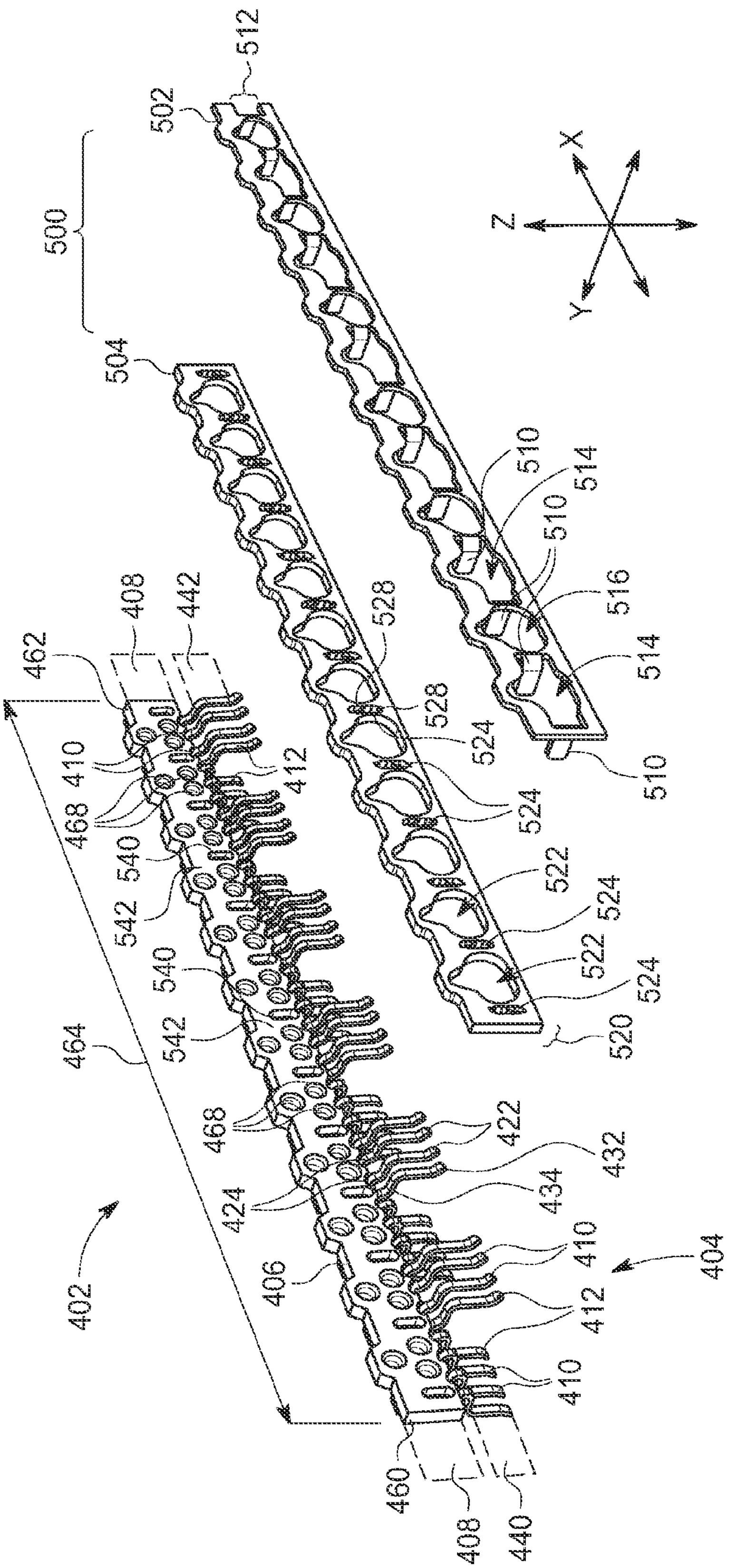
FIG. 21 is a perspective assembly view from the rear of the terminal wafer of the receptacle connector illustrating the conductive ground shielding in relation thereto.

As illustrated in FIGS. 20-22, in an embodiment, the grounding apertures 540 may be non-complementary in shape or alignment with the grounding projections 510 to twist or distort them. For example, the grounding apertures 540 may be shaped as slots similar in vertical dimension to the tabs that form the grounding projections 510 but which have first and second offset legs 544 that are laterally offset (in the x-axis) with respect to the vertical alignment of the grounding projections. The first and second offset legs 544 can be disposed toward the lateral wafer ends of the receptacle wafer so that the grounding apertures 540 do not conform in vertical alignment with the grounding projections 510 extending from the projection plate 502. In addition, the lateral direction of the offsets in the offset legs 544 may alternate between adjacent ground terminals 412 to provide an alternating arrangement of offset grounding aperture 540 disposed laterally across the terminal array 404. In other embodiments, the non-complementary alignment between the projections and apertures can be provided by other arrangements such as by non-complementary shapes or outlines of the projections and apertures including mismatching circles, squares, and/or diamonds or by disposing the apertures in a non-perpendicular direction through the ground terminals.

As illustrated in FIGS. 20-21, to mechanically and electrically interconnect the first ground shielding 500 and the ground terminals 412, the projection plate 502 is positioned with respect to the rest of the receptacle wafer 402 so that the grounding projections 510 are aligned with the plurality of grounding apertures 540 in the ground terminals 412. The intermediate plate 504 may be disposed between the terminal support molding 406 and the projection plate 502 so that the slots 524 in the intermediate plate 504 and corresponding mold openings 542 in the terminal support molding 406 align allowing passage of the grounding projections 510 from the plane of the projection plate 502 through the common wafer plane 408 of the receptacle wafer 402. Upon insertion of the grounding projections 510 into the grounding apertures 540 of the ground terminals 412, the offset legs 544 will cause the tab-like grounding projections to rotate or twist with respect to the vertical extension of the grounding projection and the ground terminal. The material and thickness of the projection plate 502 can be selected to facilitate distortion of the grounding projections 510. The torsional force caused by rotation of the grounding projection 510 in the respective grounding apertures 540 provides good mechanical and electrical contact between the ground shielding 500 and each of the ground terminals 412 in that ground shielding and ground terminals are unlikely to disengage and while maintaining good conductivity.

In an embodiment, the slots 524 disposed in the intermediate plate 504 can also have offset legs 528 laterally offset with respect to the vertical extension of the tab-like grounding projections 510 to distort the grounding projections upon insertion through the intermediate plate. Distortion of the grounding projections 510 within the slots 524 ensures the projection plate 502 and intermediate plate 504 are mechanically and electrically coupled together. Referring to FIGS. 18-21 and 23, because the insulator 384 may be removed from the cable plurality 108 where the signal conductors 380 terminate in the conductor termination holes 428 of the signal terminals 410, the thickness of the first ground shielding 500 may assist in impendence at the termination point. In addition, it will be appreciated that because the grounding projections 510 are disposed on either side of the cable openings 516 in the projection plate 502 and the cable openings 522 of the intermediate plate 504, the tab-like grounding projections 510 will extend to either side of and parallel with the cables as they connect with the receptacle wafer 402. Moreover, as illustrated in FIGS. 20-23, the grounding projections 510 will be adjacent the conductor termination holes 428 where the signal conductors and the signal terminals 410 are conductively joined such that a grounding projection 510 is located between the termination ends of each of the differential pairs of signal terminals 410. The grounding projections 510 thus further isolate and improve coupling between the signal conductors within the receptacle wafer.

Figure 24:
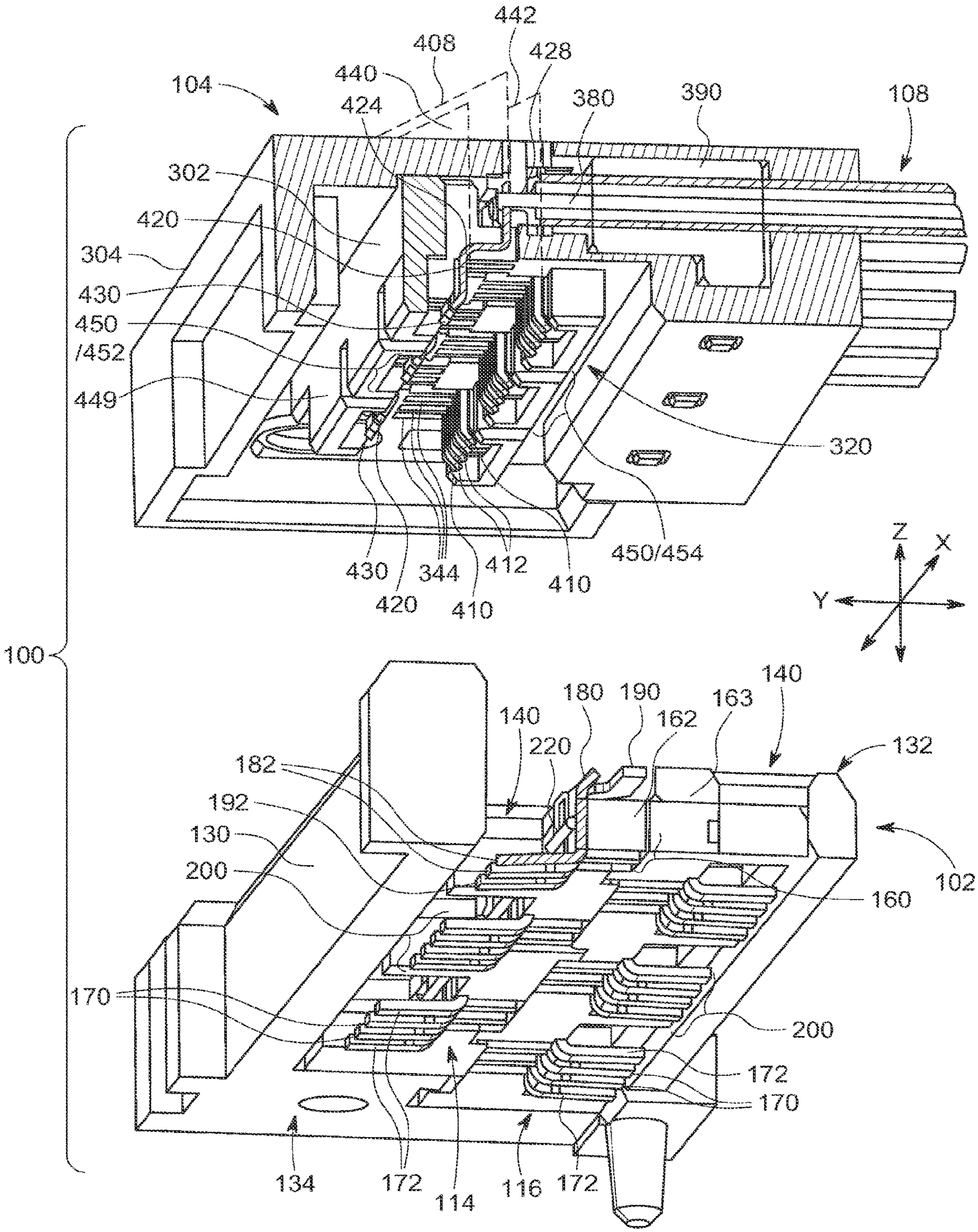
FIG. 24 is a perspective view of cross-sections of the plug and receptacle connectors from below being mated together to complete the connector system.
Figure 25:
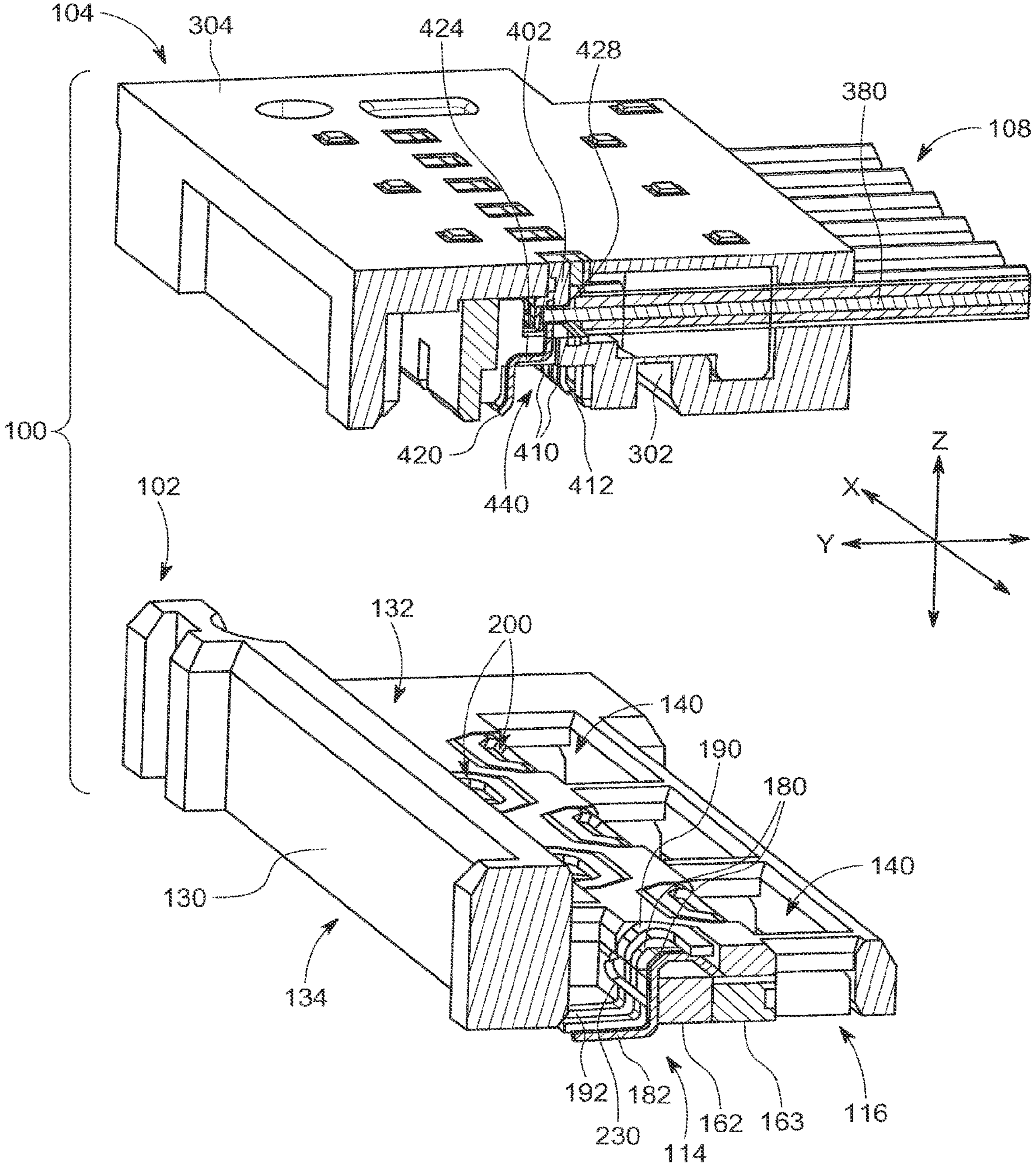
FIG. 25 is a perspective view of cross-sections of the plug and receptacle connectors from above being matter together to complete the connector system.

Referring to FIGS. 24-25, assembly of the plug connector 102 and the receptacle connector 104 to complete the connector assembly system 100 is illustrated. To complete the plug connector 102, the identical and hermaphroditic first and second plug wafers 162, 163 are connected together to form the plug terminal subassembly 160 which can be inserted into the plug insulator housing 130 from the mounting face 132. When the plug terminal subassembly 160 is installed, the mating ends 180, 190 of the ground and signal terminals 172, 174 project upwardly (along the vertical z-axis) through the terminal openings 140 disposed in the plug insulator housing 120. Each terminal opening 140 can accommodate one of the plurality of terminal groups 200, for example a differential pair of signal terminals 174 and adjacent ground terminals 176, and may maintain the terminal groups 200 in the offset and staggered relation enabled by laterally shifting (with respect to the lateral direction or x-axis) the first and second plug wafers 162, 163. The mounting ends 182, 192 of the signal and ground terminals 174, 176 are exposed at and substantially co-planar to the mounting face 132 of the plug connector 102. Because of the parallel, connected first and second plug wafers 162, 163, the mounting ends 182, 192, which may formed as surface mount tails, correspond with the parallel first and second inline terminal rows 114, 116 of the connector assembly 100 described above.

To complete the receptacle connector 104, the plurality of cables 108 aligned in a row can be directed into the receptacle housing 300 and terminated to the signal and ground terminals 410, 412 of the receptacle wafer 402 as described above. As illustrated, for example, a signal conductor 380 of the cables 108 can be terminated in the conductor termination hole 428 of a signal terminal 410. The receptacle wafer 402 is installed in the lower housing component 302 with the mating ends 420, 430 received in the individual terminal slots 344 disposed therein. As described, each terminal slot 344 can accommodate one of the mating ends 420, 430 of the signal or ground terminals 410, 412 which may be directed downward (with respect to the vertical z-axis direction) and accessible via the mating face 320 of the lower housing component 302. The offset mid-body portions 424, 434 of the signal and ground terminals 410, 412 align the mating ends 420, 430 in either of the first or second offset terminal planes 440, 442 as described above. Moreover, the signal and ground terminals 410, 412 are arranged in terminal groups 450 and in first and second terminal subgroups 452, 454 as described above with the downward directed mating ends 420, 430 supported in one of the plurality of terminal support blocks 449. The upper housing component 304 can be installed over the lower housing component 302 to enclose the receptacle wafer 402 and secure the plurality of cables 108 to the receptacle connector 104.

To mate the plug and receptacle connectors 102, 104 together, the receptacle connector 104 is moved vertically downward (in the vertical z-axis) so that the plug connector 102 is received into the mating face 320 of the lower housing 302. The downward directed mating ends 420, 430 of the signal and ground terminals 410, 412 in the receptacle connector 104 slidingly deflect and are urged against the upwardly directed mating ends 180, 190 of the corresponding signal and ground terminals 174, 176 of the plug connector 102 to establish conductive contact. The single receptacle wafer 402 is thus mated to first and second plug wafers 162, 163. Moreover, the signal and ground terminals 410, 412 of the first terminal subgroup 452 in the receptacle wafer 402 are aligned with and conductively contact the respective terminal groups 200 in the first plug wafer 162 and the signal and ground terminals of the second terminal subgroup 454 of the receptacle wafer 402 align with and conductively contact the respective terminal groups 200 of the second plug wafer 163. In the embodiments including a retention bar 220 on the plug wafers 162, 163, the retention bar 220 is positioned proximate the mounting ends 182, 192 of the signal and ground conductors 170, 172 and located low enough to avoid interference with the sliding contact between the mating ends.

Figure 26:
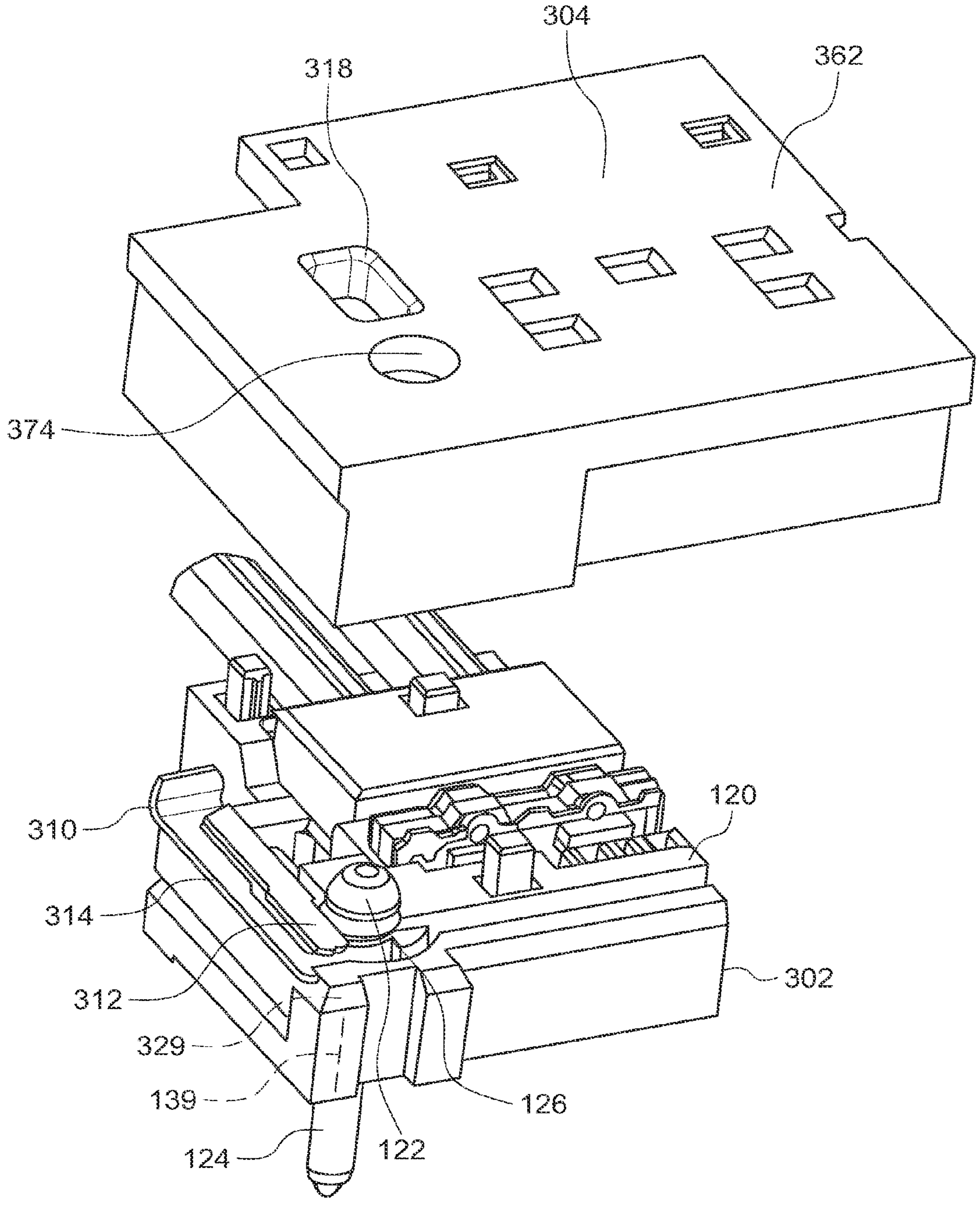
FIG. 26 is a perspective assembly view of the connector assembly illustrating interaction of the mounting nail and the nail latch.

Referring to FIG. 26, to secure the plug connector 102 and the receptacle connector 104 to the substrate, in the relevant embodiment, the mounting nail 120 can be inserted through the nail aperture 374 disposed in the upper housing component 304, the nail aperture 329 in the lower housing component 302, and the nail aperture 129 in the plug insulator housing 130. The different nail apertures, 129, 329, 374 may vertically align (with respect to the vertical z-axis) as a result of the cooperative mating features of the plug insulator housing 130 and the receptacle insulator housing 300. The mounting nail 120 can have a vertically height larger than the vertical height of connector assembly 100 so that the nail prong 124 projects from the lower mounting surface 134 associated with the plug connector 102 to engage a substrate. The nail head 122 may be dimensioned to be accommodated in the nail aperture 374 of the upper housing component 304, but have a larger diameter than the nail apertures 329, 130 of the lower housing component and plug insulator housing 302, 130 respectively to prevent clearance of the nail head 322 there through.

To lock the mounting nail 120 with respect to the lower housing component and plug insulator housing 302, 130, the nail latch 310 may be disposed between the lower and upper housing components 302, 304 of the receptacle housing 300 proximate the shorter end walls 328, 368. The nail latch 310 may be positioned so that the cantilevered latch arm 312 aligns with and is situated between the nail apertures 329, 374 of the lower and upper housing components 302, 304. In an embodiment, the nail latch 310 may be preinstalled between the lower and upper housing components during assembly of the receptacle connector 104 or later at the time the receptacle connector 104 and plug connector 102 are mated. When the mounting nail 120 is inserted through the nail aperture 374 of the upper housing component 304, the tapered tip of the nail prong 324 contacts the cantilevered latch arm 312 of the nail latch 310 and laterally deflects it to expose the nail aperture of the lower plug housing 302. The nail prong 124 may be inserted through the lower housing component 302 and the plug insulator housing 130 and the cantilevered latch arm can urge itself into the circumferential slot 126 between the nail prong 124 and the nail head 122 to lock the components together. To disassemble the connector assembly 100, a tool aperture 318 can be disposed through the ceiling 362 of the upper housing component 304 for insertion of an appropriate tool, tweezers for example, that can deflect the cantilevered latch arm 312 and release the mounting nail 120.

A possible advantage of the disclosure is that by directing terminal connection from a common wafer plane to first and second offset terminal planes associated with the first and second inline terminal rows, the vertical height of the connector assembly can be minimized while maintaining electrical channel density. Another possible advantage is that by extending retention bars about mid-body portions of terminal groups in a terminal wafer, wicking or capillary flow solder from the mounting face to the mating face can be prevented. The foregoing description describes embodiments of the disclosure and should not be construed as having a limiting effect. For example, while the disclosure describes that the offset mid-body portions are part of the terminals in the receptacle wafer such that the offset terminal planes are realized in the receptacle wafer, the offset mid-body portions may be included with the terminals in the plug wafer such that the offset terminal planes are realized in the plug wafer. Likewise, while the offset terminal planes are describes as being associated with the mating ends of the terminals in the receptacle wafer, the offset terminal planes may also be associated with the mounting ends of the terminals in the plug wafer. In such an embodiment, the mating ends of the terminals of the plug connector and of the receptacle connector are aligned in the common wafer plane associated with the receptacle wafer in the receptacle connector, and the offset terminal planes are established in the plug connector to align the mounting ends with the first and second inline terminal rows exposed at the mounting face of the plug connector.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

The invention claimed is:

1. An electrical connector assembly, comprising:

a plug connector mountable to a planar substrate, the plug connector comprising a plug insulator housing and plug terminal array having a plurality of terminals each with a mating end, a mounting end opposite the mating end, and a mid-body portion connecting the mating end to the mounting end, wherein the plurality of terminals comprise a first plurality of mounting ends aligned in a first inline terminal row and a second plurality of mounting ends aligned in a second inline terminal row, the first and second inline terminal rows are parallel and spaced apart with each other; and a receptacle connector mateable to the plug connector, the receptacle connector comprising a receptacle insulator housing and a receptacle terminal array having a plurality of terminals each with a mating end, a termination end opposite the mating end, and a mid-body portion connecting the mating end and the termination end;

wherein the plurality of terminals of each of the plug connector and the receptacle connector form a plurality of terminal groups spaced apart from one another, and the mid-body portions of the plurality of terminals of at least one of the plug terminal array and the receptacle terminal array are offset mid-body portions, and the plurality of terminals comprise a first plurality of terminal ends extending in a first direction and a second plurality of terminal ends extending in a second direction opposite that of the first direction.

2. The electrical connector assembly according to claim 1, wherein the plurality of terminal groups are positioned in first and second terminal planes and are spaced apart with each other by a pitch distance and individual ones of the plurality of the terminals in the plurality of terminal groups are spaced apart with each other by a distance less than the pitch distance.

3. The electrical connector assembly according to claim 1, wherein each of the plurality of terminal groups of the receptacle connector comprises a differential pair of signal terminals and a corresponding pair of ground terminals located to either lateral side of the differential pair of signal terminals.

4. The electrical connector assembly according to claim 3, wherein the ground terminals are joined by a ground rail.

5. The electrical connector assembly according to claim 3, wherein the plurality of terminal groups are further arranged in a plurality of first terminal subgroups operatively associated with a first offset mounting plane and a plurality of second terminal subgroups operatively associated with a second offset mounting plane.

6. The electrical connector assembly according to claim 5, wherein:

the offset mid-body portions of the signal and ground terminals of the first terminal subgroups project forward from a common wafer plane to dispose respective mating ends in the first offset mounting plane; and the offset mid-body portions of the signal and ground terminals of the second terminal subgroups may project rearward from a common wafer plane to dispose respective mating ends in the second offset mounting plane.

7. A plug connector mountable to a planar substrate configured to mate to a receptacle connector, comprising:

a plug insulator housing and plug terminal array having a plurality of terminals each with a mating end, a mounting end opposite the mating end, and a mid-body portion connecting the mating end to the mounting end, wherein the plurality of terminals comprise a first plurality of mounting ends aligned in a first inline terminal row and a second plurality of mounting ends aligned in a second inline terminal row, the first and second inline terminal rows are parallel and spaced apart with each other; and wherein the plurality of terminals form a plurality of terminal groups spaced apart from one another, the mid-body portions of the plurality of terminals are offset mid-body portions, the plurality of terminals comprise a first plurality of terminal ends extending in a forward direction and a second plurality of terminal ends extending in a rearward direction opposite that of the forward direction.

8. The plug connector according to claim 7, further comprising a plurality of terminal openings, wherein the plurality of terminal openings are aligned in a first opening row and a second opening row.

9. The plug connector according to claim 8, wherein the first opening row is adjacent to a front sidewall of the plug connector and the second opening row is adjacent to a rear sidewall of the plug connector.

10. The plug connector according to claim 9, wherein the first and second opening rows are staggered with respect to each other such that terminal openings of the first opening row are offset laterally from terminal openings of the second opening row.

11. The plug connector according to claim 10, further comprising an alignment beam that extends laterally between the first opening row and the second opening row.

12. The plug connector according to claim 11, wherein the alignment beam comprises a plurality of alternating offsets that are alternately disposed toward one of the front sidewall and the rear sidewall.

13. The plug connector according to claim 12, wherein the alignment beam is supported between the first and second opening rows by a plurality of support beams that extend perpendicularly from each of the plurality of alternating offsets toward a proximate one of the front sidewall and the rear sidewall.

14. The plug connector according to claim 13, wherein a shape of individual ones of the terminal openings is defined by the plurality of alternating offsets in the alignment beam and by the plurality of support beams.

15. The plug connector according to claim 14, wherein each of the terminal openings comprises a cutout and a notch, the cutout of each of the terminal openings being aligned parallel to the front sidewall and the rear sidewall, and the notch of each of the terminal openings being complementary to the plurality of alternating offsets of the alignment beam.

16. A receptacle connector mateable to a plug connector, comprising:

a receptacle insulator housing and a receptacle terminal array having a plurality of terminals each with a mating end, a termination end opposite the mating end, and a mid-body portion connecting the mating end and the termination end, wherein the plurality of terminals comprise a first plurality of mounting ends aligned in a first inline terminal row and a second plurality of mounting ends aligned in a second inline terminal row, the first and second inline terminal rows are parallel and spaced apart with each other; and wherein the plurality of terminals form a plurality of terminal groups spaced apart from one another, the mid-body portions of the plurality of terminals of the receptacle terminal array are offset mid-body portions, the plurality of terminals comprise a first plurality of terminal ends extending in a first direction and a second plurality of terminal ends extending in a second direction opposite that of the first direction.

17. The receptacle connector according to claim 16, further comprising:

a terminal platform that extends laterally between opposing end walls and comprises a plurality of terminal slots disposed through a lower housing component through to a mating face that to accommodates the plurality of terminals from a terminal subassembly.

18. The receptacle connector according to claim 17, further comprising a plurality of terminal slots configured to receive a respective one of the terminals that are arranged in parallel rows and staggered groups.

19. The receptacle connector according to claim 18, wherein:

the plurality of terminal slots are laterally arranged in a first slot row proximate to a front sidewall and a second slot row proximate a raised shoulder, the second slot row being parallel to the first slot row; and the terminal slots are arranged in a plurality of groups that comprise terminal slots that are offset with respect to each other in the first and second slot rows.

20. The receptacle connector according to claim 16, further comprising:

a plurality of cables arranged in a lateral row that extend in a forward and a rearward direction perpendicular to rear sidewalls of a lower housing component and an upper housing component of the receptacle connector, wherein each of the cables is a twinax cable comprising two signal conductors made of electrically conductive material extending a length of a respective cable that is surrounded by an insulator of non-conductive material, the two signal conductors being configured to cooperatively transmit differential signals.

* * * * *